(12) United States Patent
Heller et al.

(10) Patent No.: US 12,670,337 B2
(45) Date of Patent: Jun. 30, 2026

(54) GENERATIVE TEXT MODEL INTERFACE SYSTEM

(71) Applicant: Casetext, Inc., San Francisco, CA (US)

(72) Inventors: Jake Heller, San Mateo, CA (US); Pablo Arredondo, Palo Alto, CA (US); Walter DeFoor, Rockville, MD (US); Ryan Walker, Lancaster, PA (US); Javed Qadrud-Din, Union City, CA (US)

(73) Assignee: Casetext, Inc., San Francisco, CA (US)

( * ) Notice: Subject to any disclaimer, the term of this patent is extended or adjusted under 35 U.S.C. 154(b) by 155 days.

(21) Appl. No.: 18/154,175

(22) Filed: Jan. 13, 2023

(65) Prior Publication Data

US 2024/0242037 A1 Jul. 18, 2024

(51) Int. Cl.

| | |
|---|---|
| ***G06F 40/186*** | (2020.01) |
| ***G06F 40/205*** | (2020.01) |
| ***G06F 40/289*** | (2020.01) |
| ***G06F 40/35*** | (2020.01) |
| ***G06F 40/40*** | (2020.01) |

(52) U.S. Cl.

CPC ............ *G06F 40/40* (2020.01); *G06F 40/186* (2020.01); *G06F 40/205* (2020.01); *G06F 40/289* (2020.01); *G06F 40/35* (2020.01)

(58) Field of Classification Search

CPC ..... G06F 40/186; G06F 40/258; G06F 40/289

See application file for complete search history.

(56) References Cited

U.S. PATENT DOCUMENTS

| | | | | |
|---|---|---|---|---|
| 8,812,291 | B2 | 8/2014 | Brants et al. | |
| 11,281,976 | B2 | 3/2022 | Dua et al. | |
| 11,481,416 | B2 | 10/2022 | Dua et al. | |
| 2011/0125734 | A1 | 5/2011 | Duboue et al. | |
| 2018/0075011 | A1 * | 3/2018 | Allen | G16H 50/20 |
| 2018/0322110 | A1 * | 11/2018 | Rhodes | G16H 15/00 |
| 2018/0329987 | A1 | 11/2018 | Tata et al. | |
| 2019/0042551 | A1 | 2/2019 | Hwang | |
| 2019/0347563 | A1 | 11/2019 | Bruno et al. | |
| 2020/0019642 | A1 | 1/2020 | Dua et al. | |
| 2020/0243076 | A1 | 7/2020 | Kim | |

(Continued)

FOREIGN PATENT DOCUMENTS

JP 2021-152837 A 9/2021

OTHER PUBLICATIONS

U.S. Appl. No. 18/169,701, Non Final Office Action mailed May 3, 2023, 38 pgs.

(Continued)

*Primary Examiner* — Thomas H Maung

(57) ABSTRACT

A text generation prompt may be determined based on an input message from a client machine and a designated text generation prompt template. A text generation prompt message including the designated text generation prompt may be sent to a remote text generation modeling system via the communication interface. A text generation prompt response message may be received from the remote text generation modeling system. The text generation prompt response message may include novel text generated by a text generation model implemented at the remote text generation modeling system. The text generation prompt response message may be parsed to generate a response text based on the novel text.

19 Claims, 12 Drawing Sheets

(56) References Cited

U.S. PATENT DOCUMENTS

| | | | |
|---|---|---|---|
| 2020/0342862 | A1 | 10/2020 | Gao et al. |
| 2020/0364403 | A1 | 11/2020 | Choi et al. |
| 2021/0124876 | A1 | 4/2021 | Kryscinski et al. |
| 2021/0374341 | A1 | 12/2021 | Krause et al. |
| 2021/0406735 | A1 | 12/2021 | Nahamoo et al. |
| 2022/0180051 | A1 | 6/2022 | Lillemo et al. |
| 2022/0253447 | A1 | 8/2022 | Boytsov et al. |
| 2022/0284174 | A1 | 9/2022 | Galitsky |
| 2022/0318230 | A1 | 10/2022 | Sikka et al. |
| 2023/0066125 | A1 | 3/2023 | Asahara et al. |
| 2023/0080674 | A1 | 3/2023 | Attali et al. |
| 2023/0092702 | A1 | 3/2023 | Mao et al. |
| 2023/0121711 | A1 | 4/2023 | Chhaya et al. |

OTHER PUBLICATIONS

U.S. Appl. No. 18/169,707, Non Final Office Action mailed May 10, 2023, 33 pgs.

Lewis, Patrick et al. Retrieval-Augmented Generation for Knowledge-Intensive NLP Tasks. Facebook AI Research, University College London; New York University; Apr. 12, 2021.

International Preliminary Report on Patentability received for PCT Patent Application No. PCT/US2023/084899, mailed on Jul. 24, 2025, 8 pages.

International Search Report and Written Opinion received for PCT Patent Application No. PCT/US2023/084899, mailed on May 21, 2024, 10 pages.

* cited by examiner

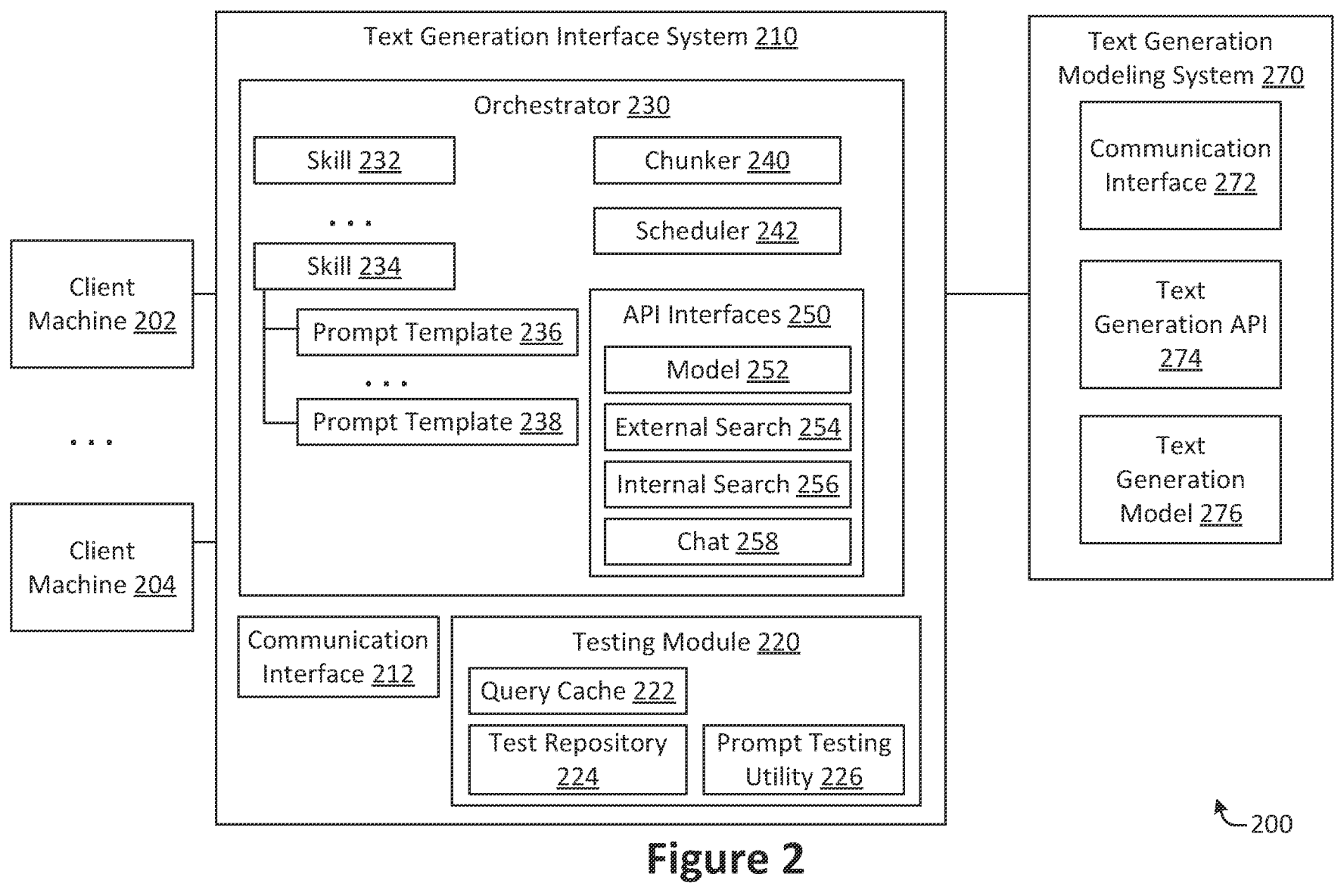

Text Generation Modeling System 270
Communication Interface 272
Text Generation API 274
Text Generation Model 276

200

Text Generation Interface System 210
Orchestrator 230
Skill 232
Skill 234
Prompt Template 236
Prompt Template 238
Chunker 240
Scheduler 242
API Interfaces 250
Model 252
External Search 254
Internal Search 256
Chat 258
Testing Module 220
Query Cache 222
Test Repository 224
Prompt Testing Utility 226
Communication Interface 212

Client Machine 202
Client Machine 204

Figure 2

GENERATIVE TEXT MODEL INTERFACE SYSTEM

FIELD OF TECHNOLOGY

This patent document relates generally to natural language processing and more specifically to the generation of novel text.

BACKGROUND

Large language models are pre-trained to generate text. A large language model may be provided with input text, such as a question. The model may then provide output text in response, such as an answer to the question. Recent advances have led large language models to become increasingly powerful, often able to produce text that approaches that which would be generated by humans.

Nevertheless, large language models have several weaknesses. For example, large language models frequently invent "facts" that sound accurate but in fact are not. As another example, large language models are often trained in a general-purpose manner since general-purpose models are best able to approach natural human-generated language. However, the general-purpose nature of the training leaves conventional large language models poorly equipped to handle technical, sensitive, domain-specific tasks such as the generation of text related to technology, law, and other disciplines. Accordingly, improved techniques for text generation are desired.

BRIEF DESCRIPTION OF THE DRAWINGS

The included drawings are for illustrative purposes and serve only to provide examples of possible structures and operations for the disclosed inventive systems, apparatus, methods and computer program products for novel text generation. These drawings in no way limit any changes in form and detail that may be made by one skilled in the art without departing from the spirit and scope of the disclosed implementations.

FIG. 2 illustrates a text generation system, configured in accordance with one or more embodiments.

DETAILED DESCRIPTION

Figure 1:
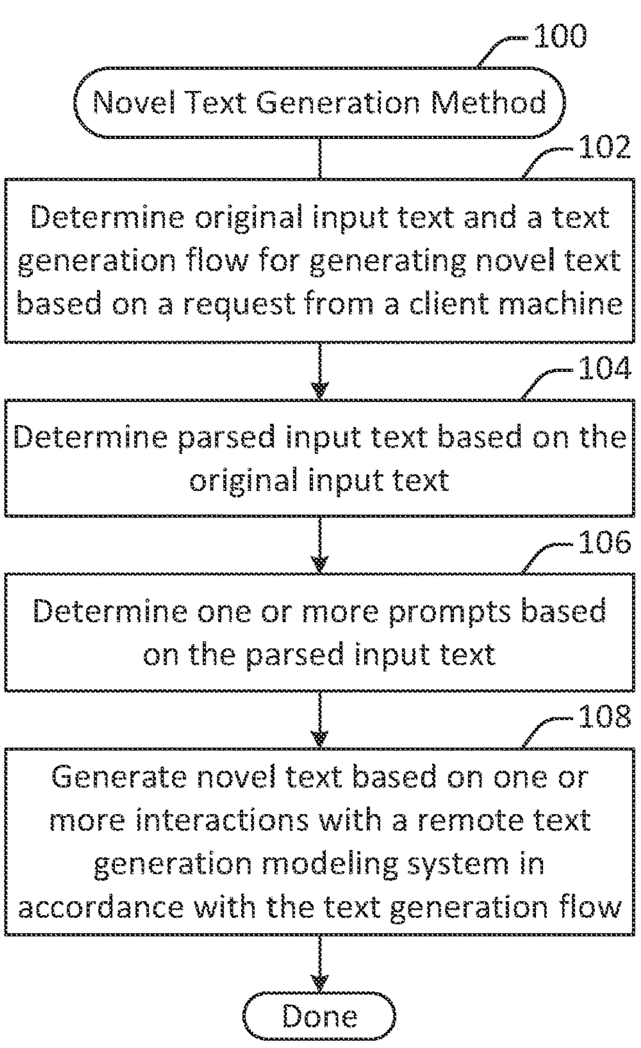
FIG. 1 illustrates a novel text generation overview method, performed in accordance with one or more embodiments.

Techniques and mechanisms described herein provide for the generation of novel text via a large language model. A text generation interface system serves as an interface between one or more client machines and a text generation system configured to implement a large language model. The text generation interface system receives a request from a client machine and processes it to produce a prompt to the large language model. After the prompt is provided to the large language model, the text generation interface system receives one or more responses. At this point, the text generation interface system may perform one or more further interactions with the text generation system and large language model. Alternatively, or additionally, the text generation interface system may perform one or more further interactions with one or more of the client machines. The text generation interface system then provides output text to the one or more client machines based on the interaction with the large language model.

According to various embodiments, techniques and mechanisms described herein provide for novel text generation in domain-specific contexts. A text generation interface system may take as input one or more arbitrary documents, process them via optical text recognition, segment them into portions, and process the segmented text via various tasks based on need. Different workflows are provided for different tasks, and this application describes a number of examples of such workflows. In many workflows, an input document is divided into chunks via a chunking technique. Then, chunks are inserted into prompt templates for processing by a large language model such as the GPT-3 or GPT-4 available from OpenAI. The large language model's response is then parsed and potentially used to trigger additional analysis, such as one or more database searches, one or more additional prompts sent back to the large language model, and/or a response returned to a client machine.

According to various embodiments, techniques and mechanisms described herein provide for retrieval augmented generation. A search is conducted base on a search query. Then, the search results are provided to an artificial intelligence system. The artificial intelligence system then further processes the search results to produce an answer base don that search results. In this context, a large language model may be used to determine the search query, apply one or more filters and/or tags, and/or synthesize potentially many different types of search.

According to various embodiments, techniques and mechanisms described herein provide for a sophisticated document processing pipeline. The pipeline receives one or more input documents, identifies text that should be kept together, identifies extraneous text such as headers, footers, and line numbers, and segments the text accordingly. In this way, the quality of the text provided to the rest of the system is improved.

According to various embodiments, techniques and mechanisms described herein provide for new approaches to text segmentation. Large language models often receive as input a portion of input text and generate in response a portion of output text. In many systems, the large language model imposes a limit on the input text size. Accordingly, in the event that the large language model is asked to summarize a length document, the document may need to be segmented into portions in order to achieve the desired summarization.

Conventional text segmentation techniques frequently create divisions in text that negatively affect the performance of the model, particularly in domains-specific contexts such as law. For example, consider a caption page of a legal brief, which includes text in a column on the left that encompasses the parties, text in a column on the right that includes the case number, a title that follows lower on the page, and line numbering on the left. In such a configuration, the text in the different columns should not be mixed and should be treated separately from the line numbers, while both columns should precede the document title, when converting the document to an input query for a large language model. However, conventional techniques would result in these semantically different elements of text being jumbled together, resulting in an uninformative query provided to the large language model and hence a low quality response. In contrast to these conventional techniques, techniques and mechanisms described herein provide for a pipeline that cleans such raw text so that it can be provided to a large language model.

According to various embodiments, techniques and mechanisms described herein provide for the division of text into chunks, and the incorporation of those chunks into prompts that can be provided to a large language model. For instance, a large language model may impose a limit of, for instance, 8,193 tokens on a task, including text input, text output, and task instructions. In order to process longer documents, the system may split them. However, splitting a document can easily destroy meaning depending on where and how the document is split. Techniques and mechanisms described herein provide for evenly splitting a document or documents into chunks, and incorporating those chunks into prompts, in ways that retain the semantic content associated with the raw input document or documents.

In some embodiments, techniques and mechanisms described herein may be applied to generate novel text in domain-specific contexts, such as legal analysis. Large language models, while powerful, have a number of drawbacks when used for technical, domain-specific tasks. When using conventional techniques, large language models often invent "facts" that are actually not true. For instance, if asked to summarize the law related to non-obviousness in the patent context, a large language model might easily invent a court case, complete with caption and ruling, that in fact did not occur. In contrast to conventional techniques, techniques and mechanisms described herein provide for the generation of novel text in domain-specific contexts while avoiding such drawbacks.

According to various embodiments, techniques and mechanisms described herein may be used to automate complex, domain-specific tasks that were previously the sole domain of well-trained humans. Moreover, such tasks may be executed in ways that are significantly faster, less expensive, and more auditable than the equivalent tasks performed by humans. For example, a large language model may be employed to produce accurate summaries of legal texts, to perform legal research tasks, to generate legal documents, to generate questions for legal depositions, and the like.

In some embodiments, techniques and mechanisms described herein may be used to divide text into portions while respecting semantic boundaries and simultaneously reducing calls to the large language model. The cost of using many large language models depends on the amount of input and/or output text. Accordingly, techniques and mechanisms described herein provide for reduced overhead associated with prompt instructions while at the same time providing for improved model context to yield an improved response.

In some embodiments, techniques and mechanisms described herein may be used to process an arbitrary number of unique documents (e.g., legal documents) that cannot be accurately parsed and processed via existing optical character recognition and text segmentation solutions.

In some embodiments, techniques and mechanisms described herein may be used to link a large language model with a legal research database, allowing the large language model to automatically determine appropriate searches to perform and then ground its responses to a source of truth (e.g., in actual law) so that it does not "hallucinate" a response that is inaccurate.

In some embodiments, techniques and mechanisms described herein provide for specific improvements in the legal domain. For example, tasks that were previously too laborious for attorneys with smaller staffs may now be more easily accomplished. As another example, attorneys may automatically analyze large volumes of documents rather than needing to perform such tasks manually. As another example, text chunking may reduce token overhead and hence cost expended on large language model prompts. As yet another example, text chunking may reduce calls to a large language model, increasing response speed. As still another example, text chunking may increase and preserve context provided to a large language model by dividing text into chunks in semantically meaningful ways.

According to various embodiments, techniques and mechanisms described herein may provide for automated solutions for generated text in accordance with a number of specialized applications. Such applications may include, but are not limited to: simplifying language, generating correspondence, generating a timeline, reviewing documents, editing a contract clause, drafting a contract, performing legal research, preparing for a depositions, drafting legal interrogatories, drafting requests for admission, drafting requests for production, briefing a litigation case, responding to requests for admission, responding to interrogatories, responding to requests for production, analyzing cited authorities, and answering a complaint.

FIG. 1 illustrates a novel text generation overview method 100, performed in accordance with one or more embodiments. According to various embodiments, the method 100 may be performed on any suitable computing system. For instance, the method 100 may be performed on the text generation interface system 230 shown in FIG. 2. The method 100 may be performed in order to generate new text based on input text provided by a client machine. For instance, the method 100 may be used to summarize a set of documents, generate correspondence, answer a search query, or the like.

At 102, original input text and a text generation flow for generating novel text is determined based on a request received from a client machine. According to various embodiments, the original input text may include one or more raw text portions received from a client machine as part of the request. For example, a request may include one or more documents. As another example, the request may include one or more search queries, which may be provided in a Boolean, structured, semi-structured, and/or natural language format.

In some embodiments, the text generation flow may define a procedure for interacting with a large language model to generate output text based on the original input text. For instance, the text generation flow may define one or more prompts or instructions to provide to the large language model.

In some implementations, the text generation flow may be determined based on user input. Alternatively, or additionally, a request from a client machine may be analyzed to aid in selecting a text generation flow. For example, a request from a client machine may include a natural language query that includes a request to "write an email" or to "summarize a topic". Such natural language may be analyzed via a large language model or other machine learning tool to determine that a text generation flow for drafting correspondence or summarizing documents should be selected.

In some embodiments, the original input text may be determined by identifying a portion of the input text that is separate from instructions, queries, and the like. For instance, a request to "summarize the following documents: document 1, document 2, document 3" may be analyzed to separate the query (i.e., "summarize the following documents") from the content of the documents themselves.

Parsed input text is determined base don the original input text at 104. In some embodiments, determining the original input text may involve performing one or more text processing operations such as cleaning, sharding, chunking, and the like. Additional details regarding text processing operations are discussed throughout the application as filed, for instance with respect to FIG. 2, FIG. 3, FIG. 4, FIG. 5, and FIG. 6.

One or more prompts are determined based on the parsed input text at 106. In some embodiments, a prompt may include a portion of parsed input text combined with one or more instructions to a large language model, as well as any other suitable information. Additional details regarding prompts are discussed throughout the application, and particularly with respect to the flows discussed with respect to FIGS. 8-10.

Novel text is generated at 108 based on one or more interactions with a remote text generation modeling system, in accordance with the text generation flow. In some embodiments, the text generation modeling system may be configured to implement a machine learning model such as a large language model. The text generation flow may involve successive communication with the text generation modeling system. These interactions may be determined based at least in part on the text generation flow. Additional details regarding the generation of novel text in accordance with a text generation flow are discussed throughout the application, and particularly with reference to the method 400 shown in FIG. 4.

FIG. 2 illustrates a text generation system 200, configured in accordance with one or more embodiments. The text generation system 200 includes client machines 202 through 204 in communication with a text generation interface system 210, which in turn is in communication with a text generation modeling system 270. The text generation modeling system 270 includes a communication interface 272, a text generation API 274, and a text generation model 276. The text generation interface system 210 includes a communication interface 212, a testing module 220, and an orchestrator 230. The testing module 220 includes a query cache 222, a test repository 224, and a prompt testing utility 226. The orchestrator 230 includes skills 232 through 234, and prompt templates 236 through 238. The orchestrator also includes a chunker 240 and a scheduler 242. The orchestrator also includes API interfaces 250, which include a model interface 252, an external search interface 254, an internal search interface 256, and a chat interface 258.

According to various embodiments, a client machine may be any suitable computing device or system. For instance, a client machine may be a laptop computer, desktop computer, mobile computing device, or the like. Alternatively, or additionally, a client machine may be an interface through which multiple remote devices communicate with the text generation interface system 210.

According to various embodiments, a client machine may interact with the text generation interface system in any of various ways. For example, a client machine may access the text generation interface system via a text editor plugin, a dedicated application, a web browser, other types of interactions techniques, or combinations thereof.

According to various embodiments, the text generation modeling system 270 may be configured to receive, process, and respond to requests via the communication interface 272, which may be configured to facilitate communications via a network such as the internet.

In some embodiments, some or all of the communication with the text generation modeling system 270 may be conducted in accordance with the text generation API 274, which may provide remote access to the text generation model 276. The text generation API 274 may provide functionality such as defining standardized message formatting, enforcing maximum input and/or output size for the text generation model, and/or tracking usage of the text generation model.

According to various embodiments, the text generation model 276 may be a large language model. The text generation model 276 may be trained to predict successive words in a sentence. It may be capable of performing functions such as generating correspondence, summarizing text, and/or evaluating search results. The text generation model 276 may be pre-trained using many gigabytes of input text and may include billions or trillions of parameters.

In some embodiments, large language models impose a tradeoff. A large language model increases in power with the number of parameters and the amount of training data used to train the model. However, as the model parameters and input data increase in magnitude, the model's training cost, storage requirements, and required computing resources increase as well. Accordingly, the large language model may be implemented as a general purpose model configured to generate arbitrary text. The text generation interface system 210 may serve as an interface between the client machines and the text generation modeling system 270 to support the use of the text generation modeling system 270 for performing complex, domain-specific tasks in fields such as law. That is, the text generation interface system 210 may be configured to perform one or more methods described herein.

According to various embodiments, the orchestrator 230 facilitates the implementation of one or more skills, such as the skills 232 through 234. A skill may act as a collection of interfaces, prompts, actions, data, and/or metadata that collectively provide a type of functionality to the client machine. For instance, a skill may involve receiving information from a client machine, transmitting one or more requests to the text generation modeling system 270, processing one or more response received form the text generation modeling system 270, performing one or more searches, and the like. Skills are also referred to herein as text generation flows. Additional detail regarding specific skills are provided with reference to FIGS. 8-10.

In some embodiments, a skill may be associated with one or more prompts. For instance, the skill 234 is associated with the prompt templates 236 and 238. A prompt template may include information such as instructions that may be provided to the text generation modeling system 270. A prompt template may also include one or more fillable portions that may be filled based on information determined by the orchestrator 230. For instance, a prompt template may be filled based on information received from a client machine, information returned by a search query, or another information source. Additional detail regarding prompt templates are provided with reference to FIGS. 8-10.

In some implementations, the chunker 240 is configured to divide text into smaller portions. Dividing text into smaller portions may be needed at least in part to comply with one or more size limitations associated with the text. For instance, the text generation API 274 may impose a maximum size limit on prompts provided to the text generation model 276. The chunker may be used to subdivide text included in a request from a client, retrieved from a document, returned in a search result, or received from any other source.

According to various embodiments, the API interfaces 250 include one or more APIs for interacting with internal and/or external services. The model interface 252 may expose one or more functions for communicating with the text generation modeling system 270. For example, the model interface 252 may provide access to functions such as transmitting requests to the text generation modeling system 270, receiving responses from the text generation modeling system 270, and the like.

In some embodiments, the external search interface 254 may be used to search one or more external data sources such as information repositories that are generalizable to multiple parties. For instance, the external search interface 254 may expose an interface for searching legal case law and secondary sources.

In some implementations, the internal search interface 256 may facilitate the searching of private documents. For instance, a client may upload or provide access to a set of private documents, which may then be indexed by the text generation interface system 210.

According to various embodiments, the chat interface 258 may facilitate text-based communication with the client machines. For instance, the chat interface 258 may support operations such as parsing chat messages, formulating responses to chat messages, identifying skills based on chat messages, and the like. In some configurations, the chat interface 258 may orchestrate text-based chat communication between a user at a client machine and the text generation model 276, for instance via web sockets.

In some embodiments, the query cache 222 may store queries such as testing queries sent to the text generation modeling system 270. Then, the query cache 222 may be instructed to return a predetermined result to a query that has already been sent to the text generation modeling system 270 rather than sending the same query again.

In some embodiments, the prompt testing utility 226 is configured to perform operations such as testing prompts created based on prompt templates against tests stored in the test repository 224.

In some embodiments, the communication interface 212 is configured to facilitate communications with the client machines and/or the text generation modeling system 270 via a network such as the internet. The scheduler 242 may be responsible for scheduling one or more tasks performed by the text generation interface system 210. For instance, the scheduler may schedule requests for transmission to the text generation modeling system 270.

Figure 3:
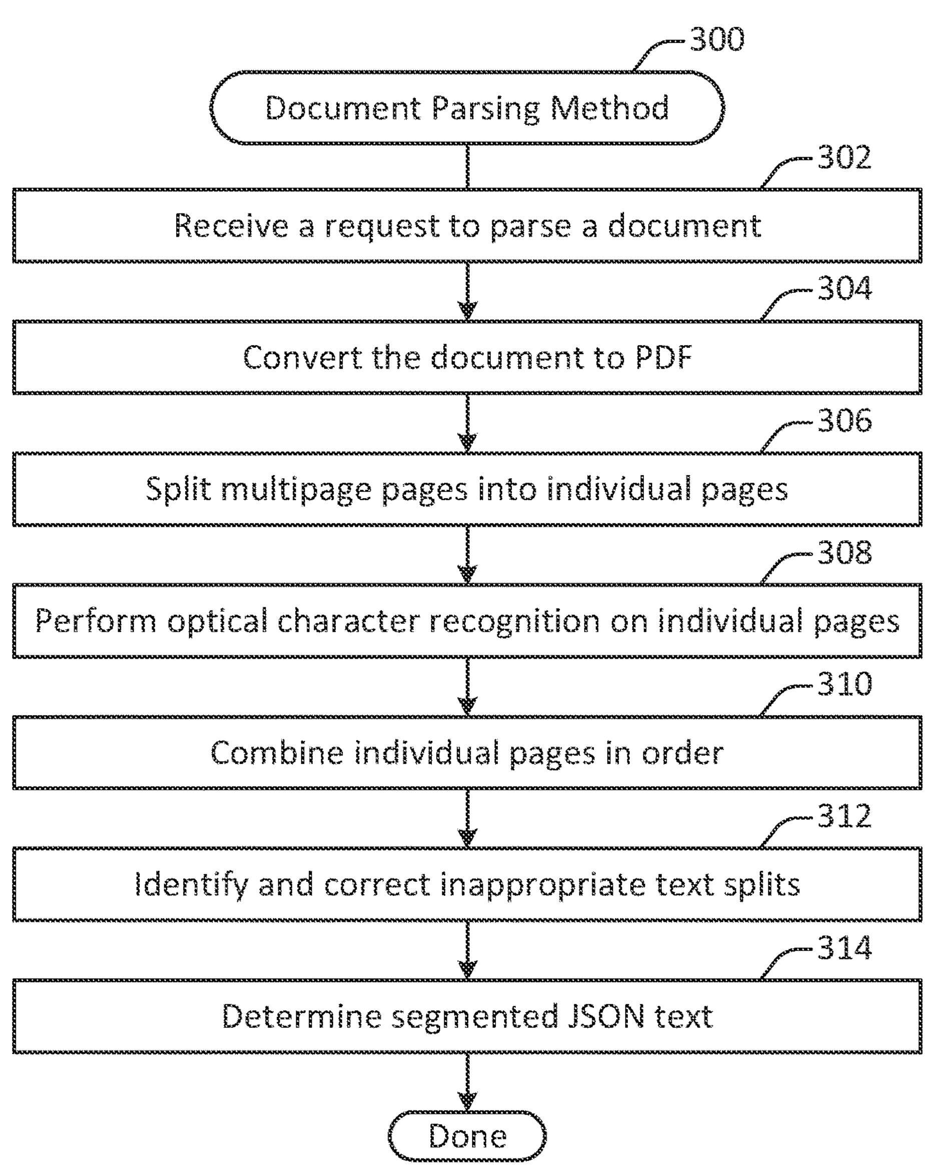
FIG. 3 illustrates a document parsing method, performed in accordance with one or more embodiments.

FIG. 3 illustrates a document parsing method 300, performed in accordance with one or more embodiments. According to various embodiments, the method 300 may be performed on any suitable computing system. For instance, the method 300 may be performed on the text generation interface system 230 shown in FIG. 2. The method 300 may be performed in order to convert a document into usable text while at the same time retaining metadata information about the text, such as the page, section, and/or document at which the text was located.

A request to parse a document is received at 302. In some embodiments, the request to parse a document may be generated when a document is identified for analysis. For example, as discussed herein, a document may be uploaded or identified by a client machine as part of communication with the text generation interface system 230. As another example, a document may be returned as part of a search result.

The document is converted to portable document format (PDF) or another suitable document format at 304. In some embodiments, the document need only be converted to PDF if the document is not already in the PDF format. Alternatively, PDF conversion may be performed even on PDFs to ensure that PDFs are properly formatted. PDF conversion may be performed, for instance, by a suitable Python library or the like. For instance, PDF conversion may be performed with the Hyland library.

Multipage pages are split into individual pages at 306. In some implementations, multipage pages may be split into individual pages via a machine learning model. The machine learning model may be trained to group together portions of text on a multipage page. For instance, a caption page in a legal decision may include text in a column on the left that encompasses the parties, text in a column on the right that includes the case number, a title that follows lower on the page, and line numbering on the left. In such a configuration, the machine learning model may be trained to treat separately the text in the different columns, and to separate the text from the line numbers. The document title may be identified as a first page, with the left column identified as the second page and the right column identified as the third page.

Optical character recognition is performed on individual pages or on the document as a whole at 308. In some implementations, optical character recognition may be performed locally via a library. Alternatively, optical character recognition may be performed by an external service. For instance, documents or pages may be sent to a service such as Google Vision. Performing optical character recognition on individual pages may provide for increased throughout via parallelization.

Individual pages are combined in order at 310. In some implementations, combining pages in order may be needed if optical character recognition were applied to individual pages rather than to the document as a whole.

Inappropriate text splits are identified and corrected at 312. In some embodiments, inappropriate text splits include instances where a paragraph, sentence, word, or other textual unit was split across different pages. Such instances may be identified by, for example, determining whether the first textual unit in a page represents a new paragraph, sentence, word, or other unit, or if instead it represents the continuation of a textual unit from the previous page. When such a split is identified, the continuation of the textual unit may be excised from the page on which it is located and moved to the end of the previous page. Such an operation may be performed by, for instance, the Poppler library available in Python.

Segmented JSON text is determined at 314. In some embodiments, the segmented JSON text may include the text returned by the optical character recognition performed at operation 308. In addition, the segmented JSON text may include additional information, such as one or more identifiers for the page, section, and/or document on which the text resides. The output of the segmented JSON may be further processed, for instance via the text sharding method 500 shown in FIG. 5 and/or the text chunking method 600 shown in FIG. 6.

Figure 4:
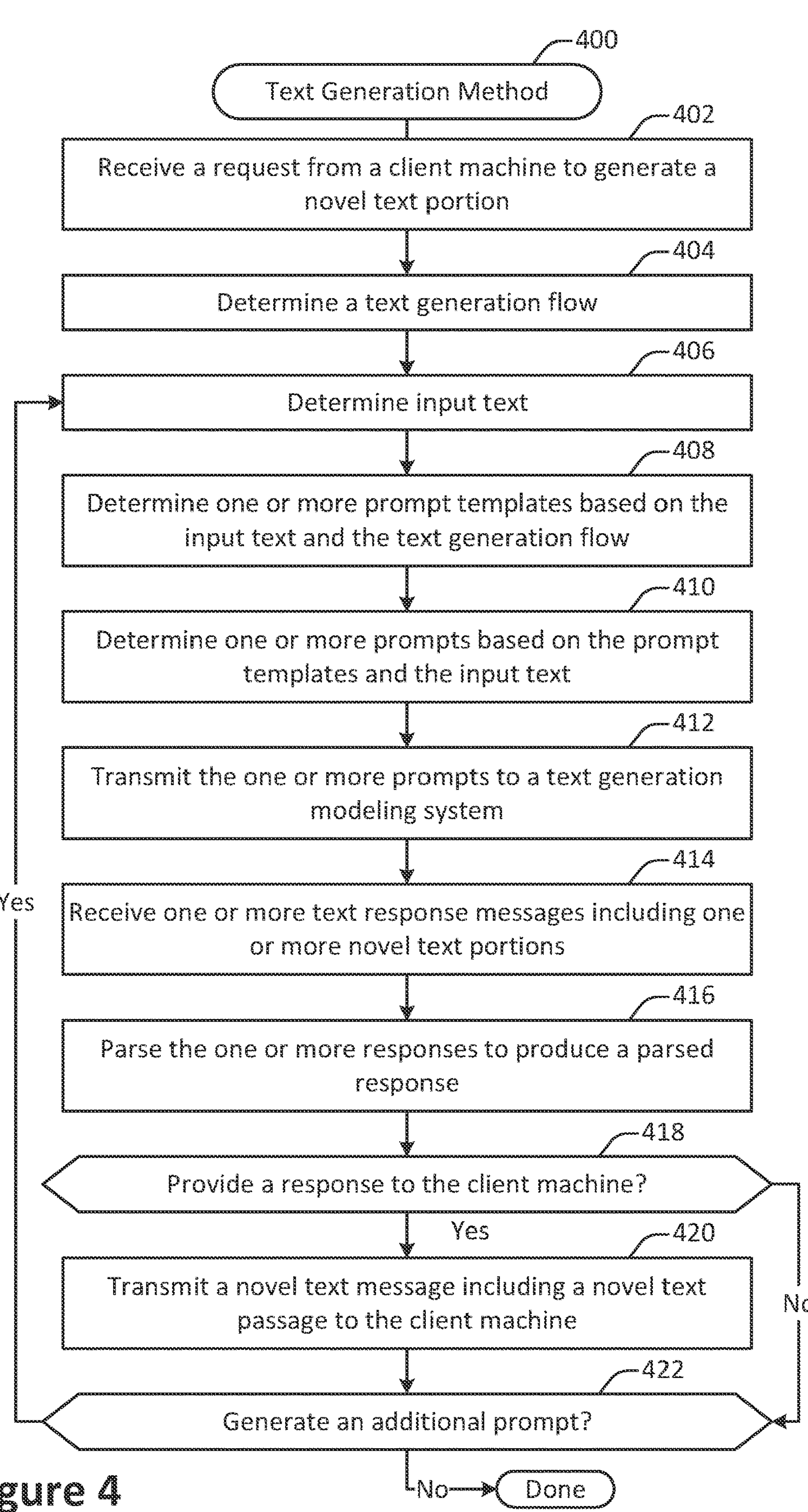
FIG. 4 illustrates a text generation method, performed in accordance with one or more embodiments.

FIG. 4 illustrates a text generation method 400, performed in accordance with one or more embodiments. According to various embodiments, the method 400 may be performed on any suitable computing system. For instance, the method 400 may be performed on the text generation interface system 230 shown in FIG. 2. The method 400 may be performed in order to identify and implement a text generation flow based on input text.

A request from a client machine to generate a novel text portion is received at 402. In some embodiments, the request may include a query portion. The query portion may include natural language text, one or more instructions in a query language, user input in some other format, or some combination thereof. For instance, the query portion may include an instruction to "write an email", "summarize documents", or "research case law".

In some embodiments, the request may include an input text portion. For example, the request may link to, upload, or otherwise identify documents. As another example, the request may characterize the task to be completed. For instance, the request may discuss the content of the desired email or other correspondence. The particular types of input text included in the request may depend in significant part on the type of request. Accordingly, many variations are possible.

A text generation flow is determined at 404. In some embodiments, the text generation flow may be explicitly indicated as part of the request received from the client machine. For instance, the client machine may select a particular text generation flow from a list. Alternatively, the text generation flow may be determined at least in part by analyzing the request received from the client machine. For example, the request may be analyzed to search for keywords or other indications that a particular text generation flow is desired. As another example, all or a portion of the request may be provided to a machine learning model to predict the requested text generation flow. In some configurations, a predicted text generation flow may be provided to the client machine for confirmation before proceeding.

Input text is determined at 406. In some embodiments, the input text may be determined by applying one or more text processing, search, or other operations based on the request received from the client machine. For example, the input text may be determined at least in part by retrieving one or more documents identified in or included with the request received from the client machine. As another example, the input text may be determined at least in part by applying one or more natural language processing techniques such as cleaning or tokenizing raw text.

In some embodiments, determining input text may involve executing a search query. For example, a search of a database, set of documents, or other data source may be executed base at least in part on one or more search parameters determined based on a request received from a client machine. For instance, the request may identify one or more search terms and a set of documents to be searched using the one or more search terms.

In some embodiments, determining input text may involve processing responses received from a text generation modeling system. For instance, all or a portion of the results from an initial request to summarizing a set of text portions may then be used to create a new set of more compressed input text, which may then be provided to the text generation modeling system for further summarization or other processing.

One or more prompt templates are determined at 408 based on the input text and the text generation flow. As discussed with respect to FIG. 2, different text generation flows may be associated with different prompt templates. Prompt templates may be selected from the prompt library based on the particular text generation flow. Additional details regarding the content of particular prompt templates is discussed with respect to the text generation flows illustrated in FIGS. 8-10.

At 410, one or more prompts based on the prompt templates are determined. In some embodiments, a prompt may be determined by supplementing and/or modifying a prompt template based on the input text. For instance, a portion of input text may be added to a prompt template at an appropriate location. As one example, a prompt template may include a set of instructions for causing a large language model to generate a correspondence document. The prompt template may be modified to determine a prompt by adding a portion of input text that characterizes the nature of the correspondence document to be generated. The added input text may identify information such as the correspondence recipient, source, topic, and discussion points.

The one or more prompts are transmitted to a text generation modeling system at 412. In some embodiments, the text generation modeling system may be implemented at a remote computing system. The text generation modeling system may be configured to implement a text generation model. The text generation modeling system may expose an application procedure interface via a communication interface accessible via a network such as the internet.

One or more text response messages are received from the remote computing system at 414. According to various embodiments, the one or more text response messages include one or more novel text portions generated by a text generation model implemented at the remote computing system. The novel text portions may be generated based at least in part on the prompt received at the text generation modeling system, including the instructions and the input text.

The one or more responses are parsed at 416 to produce a parsed response. In some embodiments, parsing the one or more responses may involve performing various types of processing operations. For example, in some systems a large language model may be configured to complete a prompt. Hence, a response message received from the large language model may include the instructions and/or the input text. Accordingly, the response message may be parsed to remove the instructions and/or the input text.

In some implementations, parsing the one or more responses may involve combining text from different responses. For instance, a document may be divided into a number of portions, each of which is summarized by the large language model. The resulting summaries may then be combined to produce an overall summary of the document.

A determination is made at 418 as to whether to provide a response to the client machine. In some embodiments, the determination made at 418 may depend on the process flow. For example, in some process flows, additional user input may be solicited by providing a response message determined based at least in part on one or more responses received from the text generation modeling system. As another example, in some process flows, a parsed response message may be used to produce an output message provided to the client machine.

If a response is to be provided to the client machine, then a client response message including a novel text passage is transmitted to the client machine at 420. In some embodiments, the client response message may be determined based in part on the text generation flow determined at 404 and in part based on the one or more text response messages received at 414 and parsed at 416. Additional details regarding the generation of a novel text passage are discussed with respect to the text generation flows illustrated in FIGS. 8-10.

A determination is made at 422 as to whether to generate an additional prompt. According to various embodiments, the determination as to whether to generation an additional prompt may be made based in part on the text generation flow determined at 404 and in part based on the one or more text response messages received at 414 and parsed at 416. As a simple example, a text generation flow may involve an initial set of prompts to summarize a set of portions, and then another round of interaction with the text generation modeling system to produce a more compressed summary. Additional details regarding the generation of a novel text passage are discussed with respect to the text generation flows illustrated in FIGS. 8-10.

According to various embodiments, the operations shown in FIG. 4 may be performed in an order different from that shown. Alternatively, or additionally, one or more operations may be omitted, and/or other operations may be performed. For example, a text generation flow may involve one or more search queries executed outside the context of the text generation modeling system. As another example, a text generation flow may involve one or more processes for editing, cleaning, or otherwise altering text in a manner not discussed with respect to FIG. 4. Various operations are possible.

Figure 5:
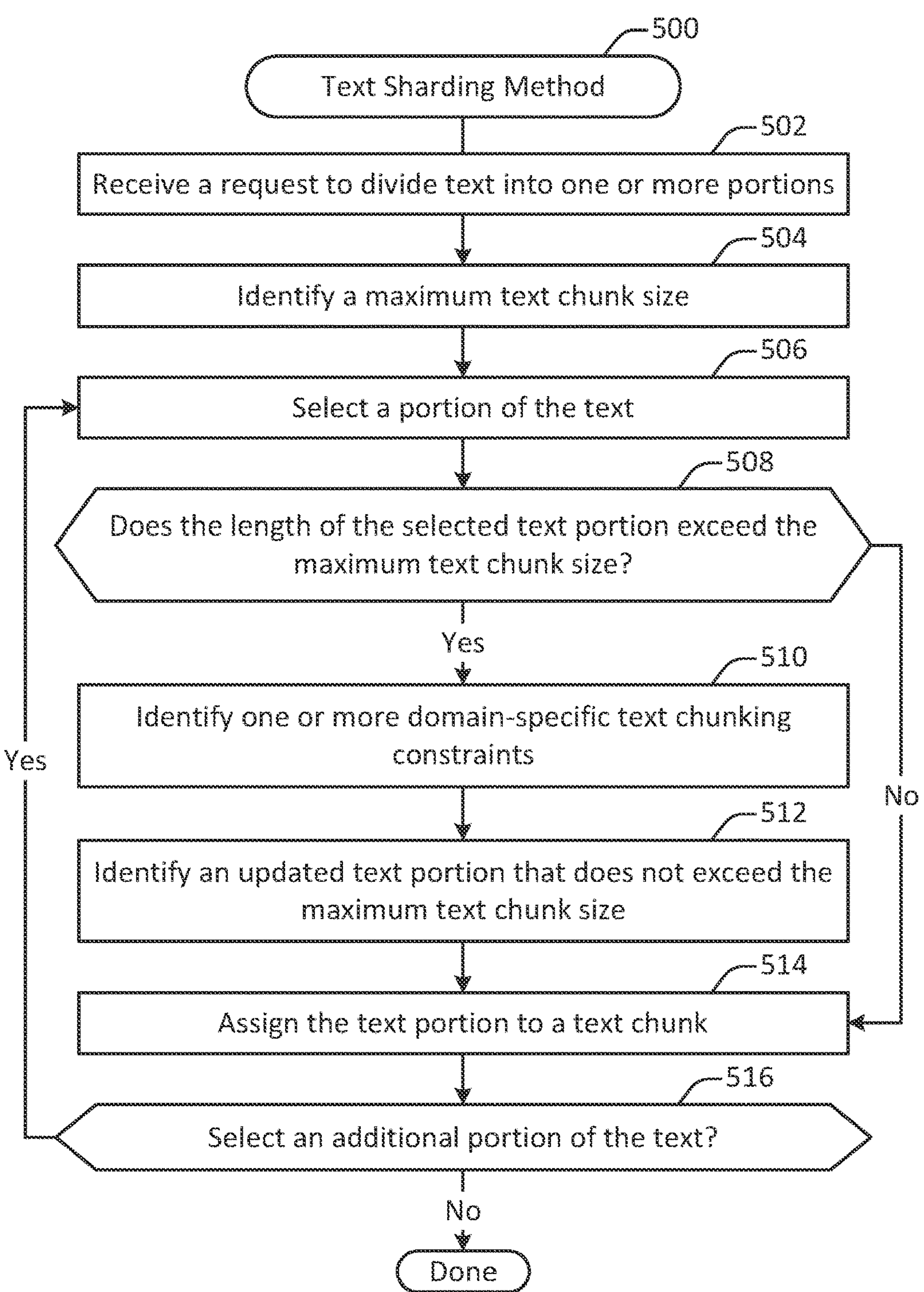
FIG. 5 illustrates a method of sharding text, performed in accordance with one or more embodiments.

FIG. 5 illustrates a method 500 of sharding text, performed in accordance with one or more embodiments. According to various embodiments, the method 500 may be performed on any suitable computing system. For instance, the method 500 may be performed on the text generation interface system 230 shown in FIG. 2. The method 500 may be performed in order to divide a body of text into potentially smaller units that fall beneath a designated size threshold, such as a size threshold imposed by an interface providing access to a large language model. For instance, a text generation modeling system implementing a large language model may specify a size threshold in terms of a number of tokens (e.g., words). As one example of such a threshold, a text generation modeling system may impose a limit of 8,193 tokens per query.

In particular embodiments, a size threshold may be adjusted based on considerations apart from a threshold imposed by an external text generation modeling system. For instance, a text generation interface system may formulate a prompt that includes input text as well as metadata such as one or more instructions for a large language model. In addition, the output of the large language model may be included in the threshold. If the external text generation modeling system imposes a threshold (e.g., 8,193 tokens), the text generation interface system 230 may need to impose a somewhat lower threshold when dividing input text in order to account for the metadata included in the prompt and/or the response provided by the large language model.

A request to divide text into one or more portions is received at 502. According to various embodiments, the request may be received as part of the implementation of one or more of the workflows shown herein, for instance in the methods shown in FIGS. 8-10. The request may identify a body of text. The body of text may include one or more documents, search queries, instruction sets, search results, and/or any other suitable text. In some configurations, a collection of text elements may be received. For instance, a search query and a set of documents returned by the search query may be included in the text.

In some implementations, text may be pre-divided into a number of different portions. Examples of divisions of text into portions may include, but are not limited to: lists of documents, documents, document sections, document pages, document paragraphs, and document sentences. Alternatively, or additionally, text may be divided into portions upon receipt at the text generation interface system 230. For instance, text may be divided into a set of portions via a text chunker, document parser, or other natural language processing tool.

A maximum text chunk size is identified at 504. In some embodiments, the maximum text chunk size may be identified based on one or more configuration parameters. In some configurations, the maximum text size may be imposed by the text generation interface system 230. Alternatively, or additionally, a size threshold may be imposed by an interface providing access to a large language model. As one example of a maximum text chunk size may be 100 kilobytes of text, 1 megabyte of text, 10 megabytes of text, or any other suitable chunk size.

A portion of the text is selected at 506. In some embodiments, as discussed herein, text may be pre-divided into text portion. Alternatively, or additionally, text may be divided into text portions as part of, or prior to, the operation of the method 500. As still another possibility, text may not be divided into portions. In such a configuration, the initial portion of text that is selected may be the entirety of the text. Then, the identification of one or more updated text portions at 512 may result in the division of the text into one or more portions as part of the operation of the method 500.

A determination is made at 508 as to whether the length of the selected text portion exceeds the maximum text chunk size. In some embodiments, the determination may be made by computing a length associated with the selected text portion and then comparing it with the maximum text chunk size. The calculation of the length associated with the selected text portion may be performed in different ways, depending on how the maximum text chunk size is specified. For instance, the maximum text chunk size may be specified as a memory size (e.g., in kilobytes or megabytes), as a number of words, or in some other fashion.

If it is determined that the length of the selected text portion exceeds the maximum text chunk size, then at 510 one or more domain-specific text chunking constraints are identified. In some embodiments, domain-specific text chunking constraints may be identified based on one or more pre-determined configuration parameters. For example, one domain-specific text chunking constraint may discourage division of a question and answer in a deposition transcript or other question/answer context. As another example, a domain-specific text chunking constraint may discourage splitting of a contract clause. As yet another example, a domain-specific text chunking constraint may discourage splitting of a minority and majority opinion in a legal opinion.

An updated text portion that does not exceed the maximum text chunk size is identified at 512. In some embodiments, the updated text portion may be determined by applying a more granular division of the text portion into small portions. For example, a document may be divided into sections, pages, or paragraphs. As another example, a document page or section may be divided into paragraphs. As another example, a paragraph may be divided into sentences. As still another example, a sentence may be divided into words. In particular embodiments, the updated text portion may be the sequentially first portion of the selected text portion that falls below the maximum text chunk size threshold identified at operation 504.

The text portion is assigned to a text chunk at 514. In some embodiments, the text may be associated with a sequence of text chunks. The text portions selected at 506 and identified at 512 may be assigned to these text chunks, for instance in a sequential order. That is, text portions near to one another in the text itself may be assigned to the same text chunk where possible to reduce the number of divisions between semantically similar elements of the text.

In particular embodiments, some attention may be paid to text divisions such as document, document section, paragraph, and/or sentence borders when assigning text portions to chunks. For instance, text portions belonging to the same document, document section, paragraph, and/or sentence may be grouped together when possible to ensure semantic continuity.

Figure 6:
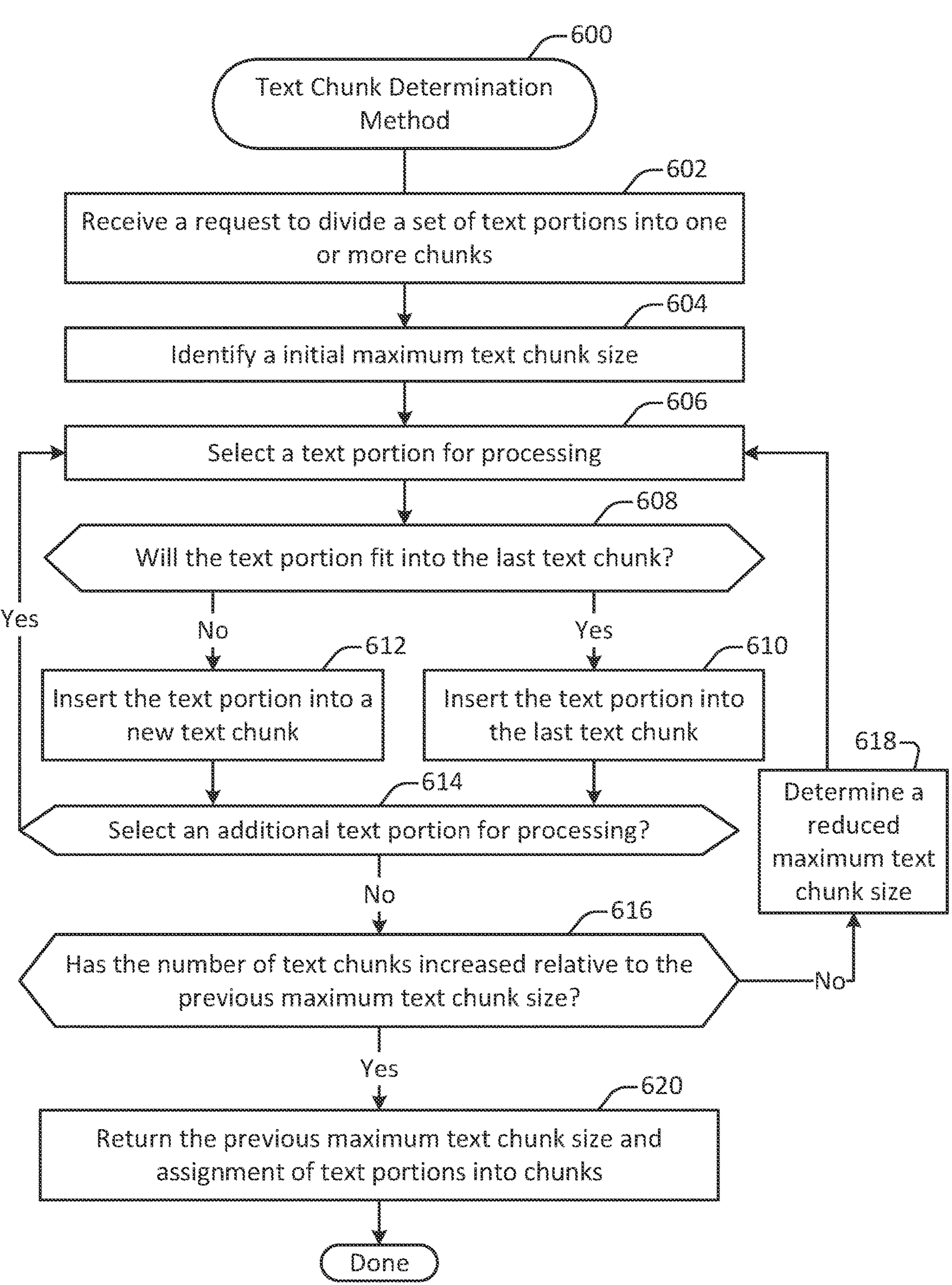
FIG. 6 illustrates a text chunk determination method, performed in accordance with one or more embodiments.

In particular embodiments, the method 500 may be performed in conjunction with the method 600 shown in FIG. 6. In such a configuration, operation 514 may be omitted. Alternatively, the assignment of text portions into text chunks in operation 514 may be treated as provisional, subject to subsequent adjustment via the method 600 shown in FIG. 6.

In some implementations, the identification of an updated text portion may result in the creation of two or more new text portions as a consequence of the division. In this case, the updated text portion may be assigned to a text chunk at 514, while the remainder portion or portions may be reserved for later selection at 506. Alternatively, or additionally, if two or more of the text portions resulting from the division at 512 each fall below the maximum text chunk size, then each of these may be assigned to a text chunk or chunks at operation 514.

A determination is made at 516 as to whether to select an additional portion of the text. According to various embodiments, additional portions of the text may continue to be selected as long as additional portions are available, or until some other triggering condition is met. For example, the system may impose a maximum amount of text for a particular interaction. As another example, the amount of text may exceed a designated threshold, such as a cost threshold.

FIG. 6 illustrates a text chunk determination method 600, performed in accordance with one or more embodiments. According to various embodiments, the method 600 may be performed on any suitable computing system. For instance, the method 600 may be performed on the text generation interface system 230 shown in FIG. 2. The method 600 may be performed in order to assign a set of text portions into text chunks.

In some embodiments, the method 600 may be used to compress text portions into text chunks of smaller size. For instance, the method 600 may receive as an input a set of text portions divided into text chunks of highly variable sizes, and then produce as an output a division of the same text portions into the same number of text chunks, but with the maximum text chunk size being lower due to more even distribution of text portions across text chunks.

A request is received at 602 to divide a set of text portions into one or more chunks. In some embodiments, the request may be automatically generated, for instance upon completion of the method 500 shown in FIG. 5. The request may identify, for instance, a set of text portions to divide into text chunks.

An initial maximum text chunk size is identified at 604. In some embodiments, the initial maximum text chunk size may be identified in a manner similar to that for operation 504 shown in FIG. 5.

A text portion is selected for processing at 606. In some embodiments, text portions may be selected sequentially. Sequential or nearly sequential ordering may ensure that semantically contiguous or similar text portions are often included within the same text chunk.

A determination is made at 608 as to whether the text portion fits into the latest text chunk. In some embodiments, text portions may be processed via the method 500 shown in FIG. 5 to ensure that each text portion is smaller than the maximum chunk size. However, a text chunk may already include one or more text portions added to the text chunk in a previous iteration.

In the event that the text portion fits into the last text chunk size, the text portion is inserted into the last text chunk at 610. If instead the text portion is the first to be processed, or the text portion does not fit into the last text chunk size, then the text portion is inserted into a new text chunk at 612. The new chunk may be created with a maximum size in accordance with the maximum text chunk size, which may be the initial maximum text chunk upon the first iteration or the reduced maximum text chunk size upon subsequent iterations.

A determination is made at 614 as to whether to select an additional text portion for processing. In some embodiments, additional text portions may be selected until all text portions have been added to a respective text chunk.

A determination is made at 616 as to whether the number of text chunks has increased relative to the previous maximum text chunk size. If the number of text chunks increases, then a reduced maximum text chunk size is determined at 618, and the text portions are again assigned into chunks in operations 606 through 614.

According to various embodiments, for the first iteration, the number of chunks will not have increased because there was no previous assignment of text portions into text chunks. However, for the second and subsequent iterations, reducing the maximum text chunk size at 618 may cause the number of text chunks needed to hold the text portions to crease because the reduced maximum text chunk size may cause a text portion to no longer fit in a chunk and instead to spill over to the next chunk.

In some embodiments, the first increase of the number of text chunks may cause the termination of the method at operation 620. Alternatively, a different terminating criteria may be met. For instance, an increase in the number of text chunks may be compared with the reduction in text chunk size to produce a ratio, and additional reductions in text chunk size may continue to be imposed so long as the ratio falls below a designated threshold.

In some embodiments, the reduced text chunk size may be determined at 618 in any of various ways. For example, the text chunk size may be reduced by a designated amount (e.g., 10 words, 5 kilobytes, etc.) As another example, the text chunk size may be reduced by a designated percentage (e.g., 1%, 5%, etc.).

When it is determined that the number of text chunks has unacceptably increased, then at 620 the previous maximum text chunk size and assignment of text portions into chunks is returned. In this way, the number of text chunks may be limited while at the same time dividing text portions more equally into text chunks. The number of text chunks may be strictly capped at the input value, or may be allowed to increase to some degree if a sufficiently improved division of text portions into text chunks is achieved.

Figure 7:
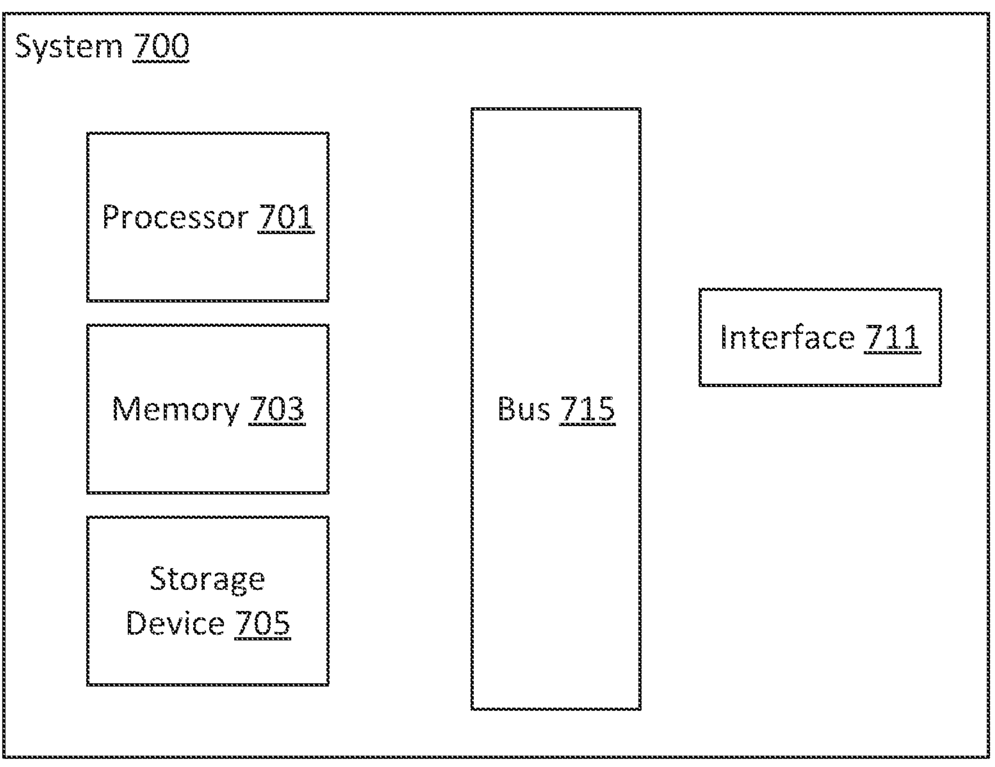
FIG. 7 illustrates one example of a computing device, configured in accordance with one or more embodiments.

FIG. 7 illustrates one example of a computing device 700, configured in accordance with one or more embodiments. According to various embodiments, a system 700 suitable for implementing embodiments described herein includes a processor 701, a memory module 703, a storage device 705, an interface 711, and a bus 715 (e.g., a PCI bus or other interconnection fabric.) System 700 may operate as variety of devices such as an application server, a database server, or any other device or service described herein. Although a particular configuration is described, a variety of alternative configurations are possible. The processor 701 may perform operations such as those described herein. Instructions for performing such operations may be embodied in the memory 703, on one or more non-transitory computer readable media, or on some other storage device. Various specially configured devices can also be used in place of or in addition to the processor 701. The interface 711 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Figure 8:
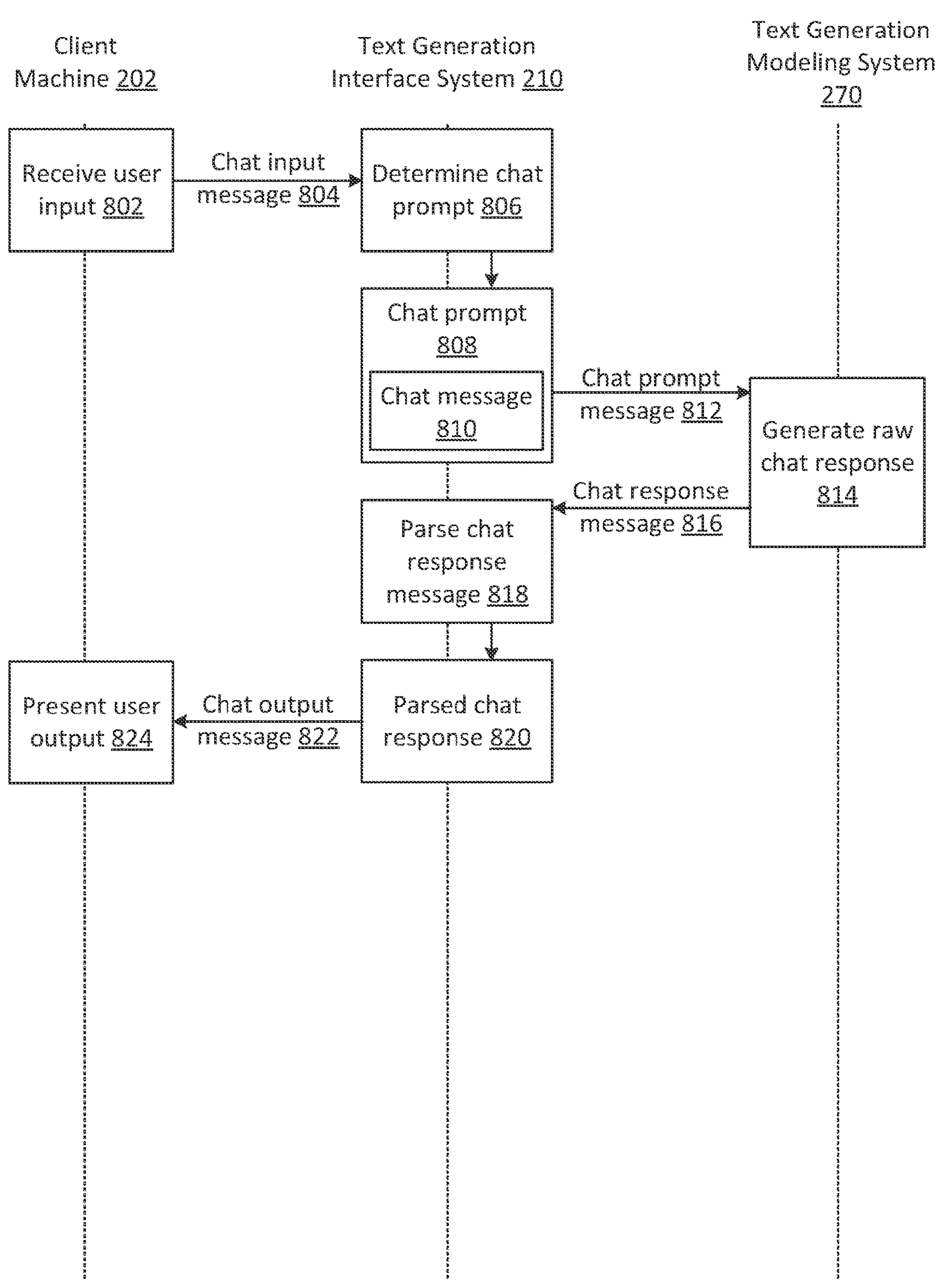
FIG. 8 illustrates an example of a method for conducting a chat session, performed in accordance with one or more embodiments.

FIG. 8 illustrates an example of a method 800 for conducting a chat session, performed in accordance with one or more embodiments. The method 800 may be performed at the text generation system 200 in order to provide one or more responses to one or more chat messages provided by a client machine. For instance, the method 800 may be performed at the text generation interface system 210 to provide novel text to the client machine 202 based on interactions with the text generation modeling system 270.

User input is received at 802. In some embodiments, the user input may be received via a chat interface such as iMessage, Google Chat, or SMS. Alternatively, or additionally, user input may be provided via a different mechanism, such as an uploaded file. The user input is used to generate a chat input message 804, which is sent to the text generation interface system 210. In some implementations, the chat input message 804 may be received by the text generation interface system 210 via a web socket.

At 806, the text generation interface system 210 determines a chat prompt 808 based on the chat input message 804. The chat prompt 808 may include one or more instructions for implementation by the text generation modeling system 270. Additionally, the chat prompt 808 includes a chat message 810 determined based on the chat input message 804.

In some implementations, determining the chat prompt 808 may involve processing the chat input message 804. In some embodiments, as discussed with respect to the methods 500 and 600 shown in FIG. 5 and FIG. 6, the chat input message 804 may be processed via text sharding and/or chunking to divide the text into manageable portions. Portions may then be included in the same or separate chat prompts depending on chunk size. For instance, text may be inserted into a template via a tool such as Jinja2.

The chat prompt 808 is then sent to the text generation modeling system 270 via a chat prompt message 812. The text generation modeling system 270 generates a raw chat response at 814, which is then sent back to the text generation interface system 210 via a chat response message at 816.

The chat response message is parsed at 818 to produce a parsed chat response at 820. In some embodiments, the chat response message received at 816 may include ancillary information such as all or a portion of the chat prompt message sent at 812. Accordingly, parsing the chat response message may involve performing operations such as separating the newly generated chat response from the ancillary information included in the chat response message. For example, the response generated by the model may include information such as the name of a chat bot, which may be removed during parsing by techniques such as pattern matching.

The parsed chat response 820 is provided to the client machine via the chat output message at 822. The parsed chat response message is then presented via user output at 824. According to various embodiments, the user output may be presented via a chat interface, via a file, or in some other suitable format.

In some implementations, the chat interaction may continue with successive iterations of the operations and elements shown at 802-824 in FIG. 8. In order to maintain semantic and logical continuity, all or a portion of previous interactions may be included in successive chat prompts sent to the text generation modeling system 270. For instance, at the next iteration, the chat prompt message sent to the text generation modeling system may include all or a portion of the initial user input, the parsed chat message determined based on the response generated by the text generation modeling system 270, and/or all or a portion of subsequent user input generated by the client machine in response to receiving the parsed chat message.

In some embodiments, the text generation modeling system 270 may be configured such that the entire state of the text generation model needs to fit in a prompt smaller than a designated threshold. In such a configuration, when the chat history grows too long to include the entire history in a single prompt, then the most recent history may be included in subsequent chat prompts.

According to various embodiments, the method 800 may be performed in such a way as to facilitate tasks more complex text analysis tasks. Examples of such complex text analysis tasks may include, but are not limited to, identifying recommended skills, generating correspondence, and revising correspondence. These tasks are discussed in more detail below.

In some embodiments, determining the chat prompt at 806 may involve selecting a chat prompt template configured to instruct the text generation modeling system 270 to suggest one or more skills. The text generation modeling system 270 may indicate the recommended skill or skills via natural language text and/or via one or more skill codes. Then, parsing the chat message at 818 may involve searching the chat response message 816 for the natural language text and/or the one or more skill codes. Skill codes identified in this way may be used to influence the generation of the chat output message sent at 822. For example, the chat output message sent at 822 may include instructions for generating one or more user interface elements such as buttons or lists allowing a user to select the recommended skill or skills. As another example, the chat output message sent at 822 may include text generated by the text generation interface system 210 that identifies the recommended skill or skills.

In some embodiments, implementing the text generation flow 800 shown in FIG. 8 may involve determining whether a more complex skill or skills need to be invoked. For instance, straightforward questions from the client machine 202 may be resolvable via a single back-and-forth interaction with the text generation modeling system 270. However, more complex questions may involve deeper interactions, as discussed with respect to FIGS. 9-11. Determining whether a more complex skill or skills need to be invoked may involve, for instance, querying the text generation modeling system 270 to identify skills implicated by a chat message. If such a skill is detected, then a recommendation may be made as part of the chat output message sent to the client machine at 822.

An example of a prompt template for generating a prompt that facilitates skill selection in the context of a chat interaction is provided below. In this prompt, one or more user-generated chat messages may be provided in the {{messages}} section:

For the purposes of this chat, your name is CoCounsel and you are a legal AI created by the legal technology company Casetext. You are friendly, professional, and helpful. You can speak any language, and translate between languages.

You have general knowledge to respond to any request. For example, you can answer questions, write poems, or pontificate on an issue.

You also have the following skills, with corresponding URLs and descriptions:

{{skills}}

When responding, follow these instructions:

If one or more skill is directly relevant to the request, respond with your reason you think it is relevant and indicate the relevant skill in the format <recommendedSkill name="[skillName]" url="[skillUrl]"/>. For example {{skill_tag_examples}}

If none of the skills are directly relevant to the request, respond using your general knowledge. Do not say it's not related to your legal skills, just respond to the request.

If you are asked to write or draft something that doesn't fit in a skill, do your best to respond with a full draft of it. Respond with only the draft and nothing else.

Never cite to a case, statute, rule, or other legal authority, even if explicitly asked.

Never point to a link, URL, or phone number, even if explicitly asked and even on Casetext's website.

Unless you are recommending a specific skill, do not talk about your skills. Just give the response to the request.

Never provide a legal opinion or interpretation of the law. Instead, recommend your legal research skill.

```
<CoCounsel>: Hello, I am CoCounsel, a legal
AI created by Casetext. What can I help
you with today?
{{messages}}
<|endofprompt|>
```

In some embodiments, determining the chat prompt at 806 may involve selecting a chat prompt template configured to instruct the text generation modeling system 270 to generate correspondence. For instance, the user input received at 802 may include a request to generate correspondence. The request may also include information such as the recipient of the correspondence, the source of the correspondence, and the content to be included in the correspondence. The content of the correspondence may include, for instance, one or more topics to discuss. The request may also include metadata information such as a message tone for generating the correspondence text. Then, the chat response message received at 816 may include novel text for including in the correspondence. The novel text may be parsed and incorporated into a correspondence letter, which may be included with the chat output message sent at 822 and presented to the user at 824. For instance, the parser may perform operations such as formatting the novel text in a letter format.

In some embodiments, determining the chat prompt at 806 may involve selecting a chat prompt template configured to instruct the text generation modeling system 270 to revise correspondence. For instance, the user input received at 802 may include a request to revise correspondence. The request may also include information such as the correspondence to be revised, the nature of the revisions requested, and the like. For instance, the request may include an indication that the tone of the letter should be changed, or that the letter should be altered to discuss one or more additional points. Then, the chat response message received at 816 may include novel text for including in the revised correspondence. The novel text may be parsed and incorporated into a revised correspondence letter, which may be included with the chat output message sent at 822 and presented to the user at 824. For instance, the parser may perform operations such as formatting the novel text in a letter format.

An example of a prompt template that may be used to generate a prompt for determining an aggregate of a set of summaries of documents is provided below:

A lawyer has submitted the following question:

```
$$QUESTION$$
{{ question }}
$$/QUESTION$$
```

We have already reviewed source documents and extracted references that may help answer the question. We have also grouped the references and provided a summary of each group as a "response":

```
$$RESPONSES$$
{% for response in model_responses %}
{{ loop.index }}. {{ response }}
{% endfor %}
$$/RESPONSES$$
```

We want to know what overall answer the responses provide to the question.

We think that some references are more relevant than others, so we have assigned them relevancy scores of 1 to 5, with 1 being least relevant and 5 being most relevant. However, it's possible that some references may have been taken out of context. If a reference is missing context needed to determine whether it truly supports the response, subtract 1 point from its relevancy score.

Then, rank each response from most-reliable to least-reliable, based on the adjusted relevancy scores and how well the references support the response.

Draft a concise answer to the question based only on the references and responses provided, prioritizing responses that you determined to be more reliable.

If the most-reliable response completely answers the question, use its verbatim text as your answer and don't mention any other responses.

Answer only the question asked and do not include any extraneous information.

Don't let the lawyer know that we are using responses, references, or relevancy scores; instead, phrase the answer as if it is based on your own personal knowledge.

Assume that all the information provided is true, even if you know otherwise

If the none of the responses seem relevant to the question, just say "The documents provided do not fully answer this question; however, the following results may be relevant." and nothing else.

---

<|endofprompt|>

---

Figure 9:
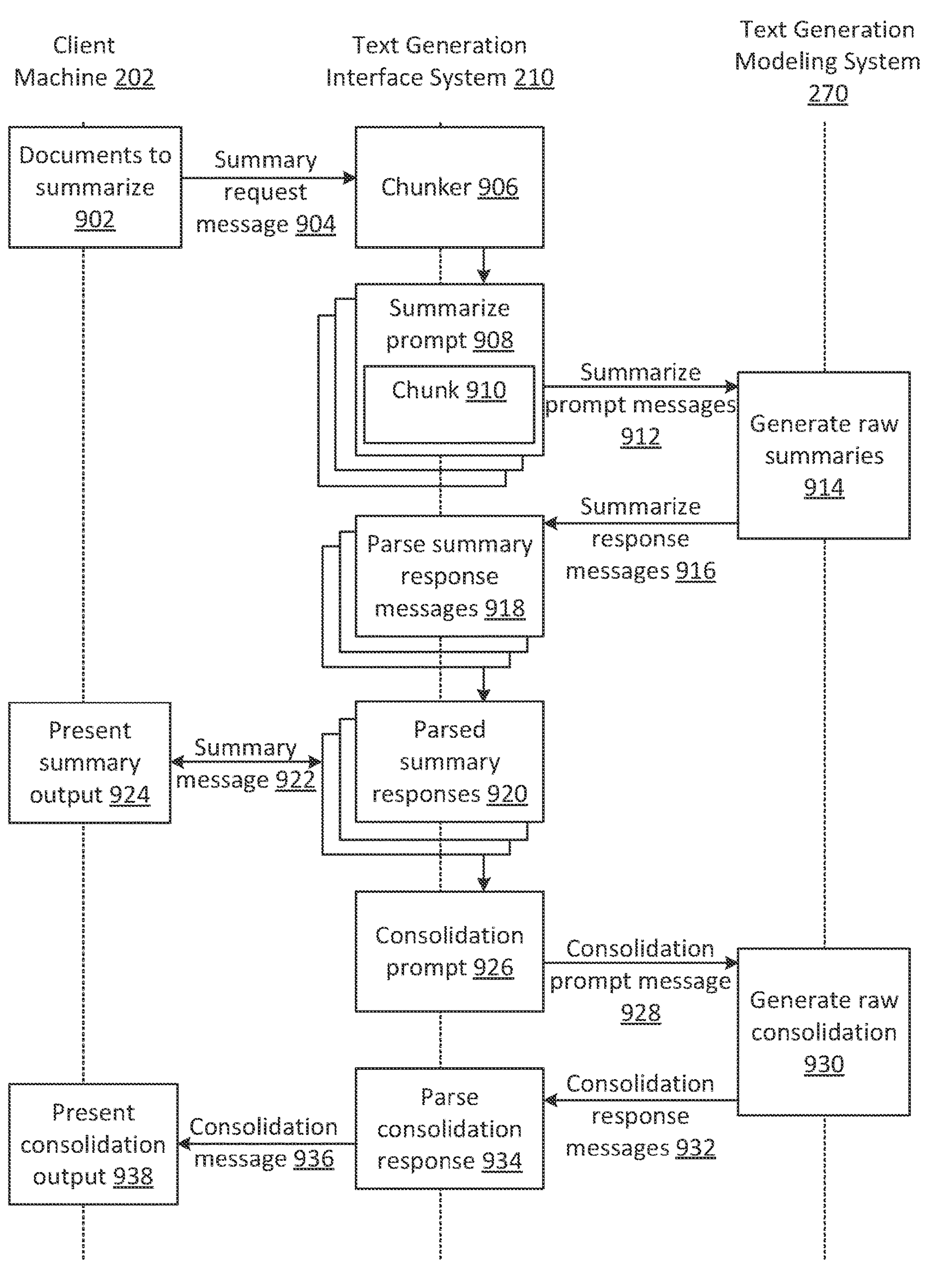
FIG. 9 illustrates an example of a method for generating a document summary, performed in accordance with one or more embodiments.

Here's the answer and nothing else:

FIG. 9 illustrates an example of a method 900 for generating a document timeline, performed in accordance with one or more embodiments. The method 900 may be performed at the text generation system 200 in order to summarize one or more documents provided or identified by a client machine. In some configurations, the method 900 may be performed to summarize one or more documents returned by a search query.

One or more documents are received at 902. In some embodiments, a document may be uploaded by the client machine. Alternatively, a document may be identified by the client machine, for instance via a link. As still another possibility, a document may be returned in a search result responsive to a query provided by a client machine. A single summary request may include documents identified and provided in various ways.

In some embodiments, the one or more documents may be received along with user input. The user input may be received via a chat interface such as iMessage, Google Chat, or SMS. Alternatively, or additionally, user input may be provided via a different mechanism, such as an uploaded file. The user input may be used to generate a summary input message 904, which is sent to the text generation interface system 210. In some implementations, the summary input message 904 may be received by the text generation interface system 210 via a web socket. Alternatively, a different form of communication may be used, for instance an asynchronous mode of communication.

At 906, the text generation interface system 210 determines one or more summarize prompt 908 based on the summary request message 904. In some embodiments, the determination of the summarize prompt may involve processing one or more input documents via the chunker. As discussed herein, for instance with respect to the methods 500 and 600 shown in FIG. 5 and FIG. 6, the chunker may perform one or more operations such as pre-processing, sharding, and/or chunking the documents into manageable text. Then, each chunk may be used to create a respective summarize prompt for summarizing the text in the chunk. For instance, text may be inserted into a template via a tool such as Jinja2.

The one or more summarize prompts 908 may include one or more instructions for implementation by the text generation modeling system 270. Additionally, the one or more summarize prompts each includes a respective text chunk 910 determined based on the summary request message 904.

The one or more summarize prompts 908 are then sent to the text generation modeling system 270 via one or more summarize prompt messages 912. The text generation modeling system 270 generates one or more raw summaries at 914, which are then sent back to the text generation interface system 210 via one or more summarize response messages at 916.

The one or more summarize response messages are parsed at 918 to produce one or more parsed summary responses at 920. In some embodiments, the one or more summary response messages received at 916 may include ancillary information such as all or a portion of the summarize prompt messages sent at 912. Accordingly, parsing the summarize response messages may involve performing operations such as separating the newly generated summaries from the ancillary information included in the one or more summarize response messages.

An example of a prompt template used to instruct a text generation system to summarize a text is shown below:

You are a highly sophisticated legal AI. A lawyer has submitted questions that need answers.

Below is a portion of a longer document that may be responsive to the questions:

---

```
$$DOCUMENT$$
  {%- for page in page_list -%}
    $$PAGE {{ page["page"] }}$$
    {{ page["text"] }}
    $$/PAGE$$
  {%- endfor -%}
$$/DOCUMENT$$
```

---

We would like you to perform two tasks that will help the lawyer answer the questions. Each task should be performed completely independently, so that the lawyer can compare the results.

Extractive Task

The purpose of this task is not to answer the questions, but to find any passages in the document that will help the lawyer answer them. For each question, perform the following steps:

1. Extract verbatim as many passages from the document (sentences, sentence fragments, or phrases) as possible that could be useful in answering the question. There is no limit on the number of passages you can extract, so more is better. Don't worry if the passages are repetitive; we need every single one you can find.

If the question asks for a list of things or the number of times something occurred, include a passage for every instance that appears in the document 2. If you extracted any passages, assign each one a score from 1 to 5, representing how the passage relates to the question:

5 (complete answer)
4 (one piece of a multipart answer)
3 (relevant definition or fact)
2 (useful context)
1 (marginally related)

Abstractive Task

The purpose of this task is to compose an answer to each question. Follow these instructions:

Base the answer only on the information contained in the document, and no extraneous information. If a direct answer cannot be derived explicitly from the document, do not answer.

Answer completely, fully, and precisely.

Interpret each question as asking to provide a comprehensive list of every item instead of only a few examples or notable instances. Never summarize or omit information from the document unless the question explicitly asks for that.

Answer based on the full text, not just a portion of it.

For each and every question, include verbatim quotes from the text (in quotation marks) in the answer. If the quote is altered in any way from the original text, use ellipsis, brackets, or [sic] for minor typos.

Be exact in your answer. Check every letter.

There is no limit on the length of your answer, and more is better

Compose a full answer to each question; even if the answer is also contained in a response to another question, still include it in each answer Here are the Questions:

```
$$QUESTIONS$$
{{ question_str }}
$$/QUESTIONS$$
```

Return your responses as a well-formed JSON array of objects, with each object having keys of:

'id' (string) The three-digit ID associated with the Question

'passages' (array) a JSON array of the verbatim passages you extracted, or else an empty array. Format each item as a JSON object with keys of:

'passage' (string)

'score' (int) the relevancy score you assigned the passage

'page' (int) the number assigned to the page in which the snippet appears

'answer' (string) the answer you drafted, or else "N/A"

Escape any internal quotation marks or newlines using \" or \n

```
[{"id": <id>, "passages": [{"passage":
<passage>, "score": <score>, "page":
<page>},...]|[ ], "answer": <text>|"N/A"},...]
```

Only valid JSON; check to make sure it parses, and that quotes within quotes are escaped or turned to single quotes, and don't forget the ',' delimiters.

```
<|endofprompt|>
```

Here is the JSON Array and Nothing Else:

According to various embodiments, the one or more parsed summary responses 920 may be processed in any of various ways. In some embodiments, the one or more parsed summary response messages 920 may be concatenated into a summary and provided to the client machine via a summary message 922. The summary may then be presented as output on the client machine at 924. Presenting the summary as output may involve, for instance, presenting the summary in a user interface, outputting the summary via a chat interface, and/or storing the summary in a file.

In some embodiments, the one or more parsed summary responses 920 may be used as input to generate a consolidated summary. For example, a consolidated summary may be generated if the aggregate size of the parsed summary responses 920 exceeds or falls below a designated threshold. As another example, a consolidated summary may be generated if the client machine provides an instruction to generated a consolidated summary, for instance after receiving the summary message at 922.

In some embodiments, generating a consolidated summary may involve determining a consolidation prompt at 926. The consolidation prompt may be determined by concatenating the parsed summary responses at 920 and including the concatenation result in a consolidation prompt template. In the event that the concatenated parsed summary responses are too long for a single chunk, then more than one consolidation prompt may be generated, for instance by dividing the parsed summary response 920 across different consolidation prompts.

In some implementations, one or more consolidation prompt messages including the one or more consolidation prompts are sent to the text generation modeling system 270 at 928. The text generation modeling system 270 then generates a raw consolidation of the parsed summary responses 920 and provides the novel text generated as a result via one or more consolidation response messages sent at 932.

According to various embodiments, the one or more consolidation response messages are parsed at 934. For instance, if the one or more consolidation response messages include two or more consolidation response messages, each of the different messages may be separately parsed, and the parsed results concatenated to produce a consolidated summary. The consolidated summary is provided to the client machine at 936 via a consolidation message. The client machine may then present the consolidated summary as consolidation output at 938. In the event that further consolidation is required, operations 92-934 may be repeated.

Figure 10:
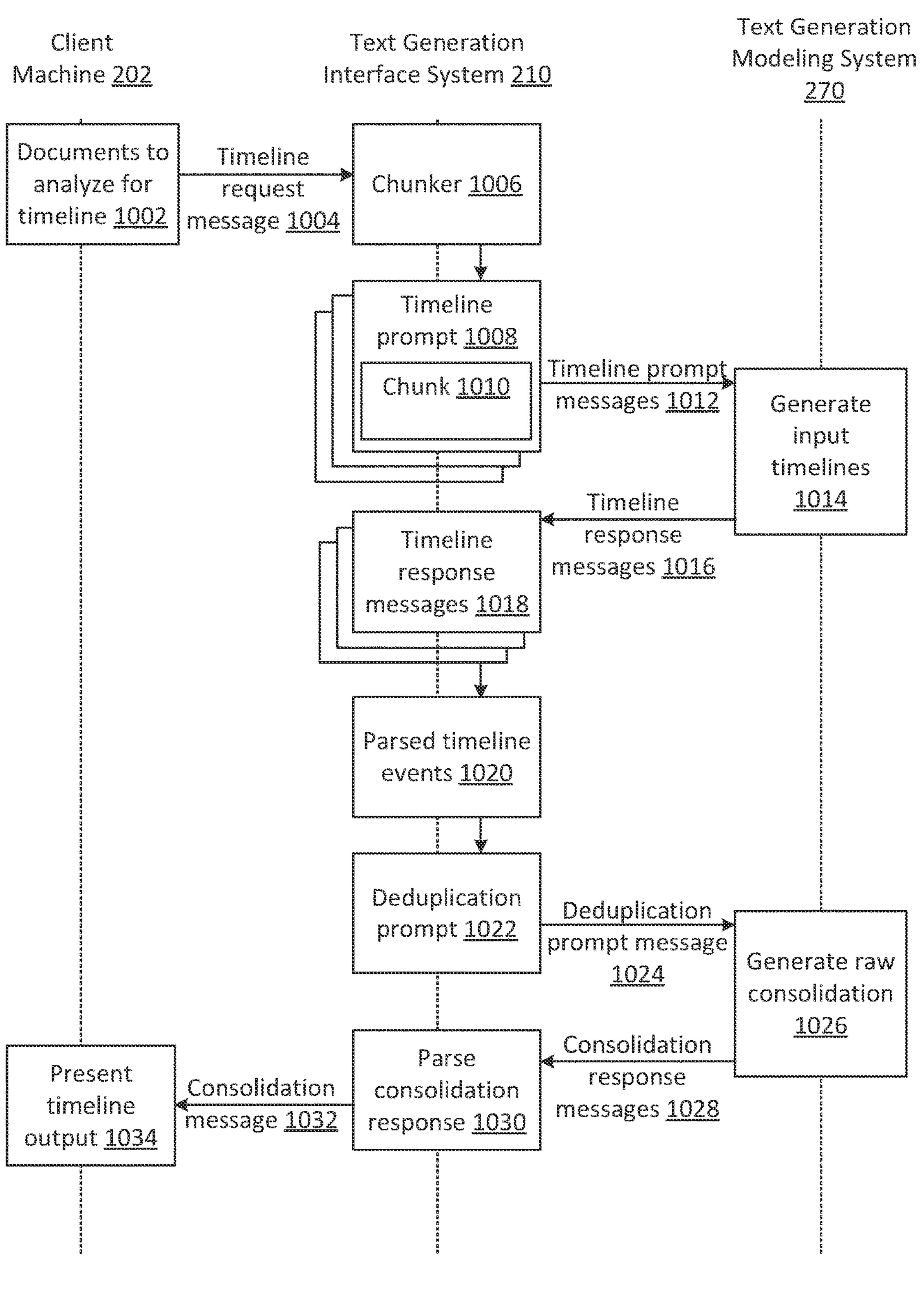
FIG. 10 illustrates an example of a method for generating a timeline, performed in accordance with one or more embodiments.

FIG. 10 illustrates an example of a method 1000 for generating a timeline, performed in accordance with one or more embodiments. The method 1000 may be performed at the text generation system 200 in order to generate an event timeline based on one or more documents provided or identified by a client machine. In some configurations, the method 1000 may be performed to generate a timeline based on one or more documents returned by a search query.

One or more documents are received at 1002. In some embodiments, a document may be uploaded by the client machine. Alternatively, a document may be identified by the client machine, for instance via a link. As still another possibility, a document may be returned in a search result responsive to a query provided by a client machine. A single timeline generation request may include documents identified and provided in various ways.

In some embodiments, the one or more documents may be received along with user input. The user input may be received via a chat interface such as iMessage, Google Chat, or SMS. Alternatively, or additionally, user input may be provided via a different mechanism, such as an uploaded file.

The user input may be used to generate a timeline generation request message 1004, which is sent to the text generation interface system 210. In some implementations, the timeline generation request message 1004 may be received by the text generation interface system 210 via a web socket. Alternatively, a different form of communication may be used, for instance an asynchronous mode of communication.

At 1006, the text generation interface system 210 determines one or more timeline generation prompts 1008 based on the timeline generation request message 1004. In some embodiments, the determination of the one or more timeline prompts may involve processing one or more input documents via the chunker. As discussed herein, for instance with respect to the methods 500 and 600 shown in FIG. 5 and FIG. 6, the chunker may perform one or more operations such as pre-processing, sharding, and/or chunking the documents into manageable text. Then, each chunk may be used to create a respective summarize prompt for summarizing the text in the chunk. For instance, text may be inserted into a template via a tool such as Jinja2.

The one or more timeline generation prompts 1008 may include one or more instructions for implementation by the text generation modeling system 270. Additionally, the one or more timeline generation prompts each includes a respective text chunk 1010 determined based on the timeline generation request message received at 1004.

The one or more timeline generation prompts 1008 are then sent to the text generation modeling system 270 via one or more timeline generation prompt messages 1012.

The text generation modeling system 270 generates one or more input timelines at 1014, which are then sent back to the text generation interface system 210 via one or more timeline generation response messages at 1016.

An example of a prompt template for generating a prompt for generating a timeline is provided below:

You are a world-class robot associate reviewing the following text. It may be an excerpt from a larger document, an entire document, or encompass multiple documents.

```
$$TEXT$$
    {% for page in page_list %}
      $$PAGE {{ page["page"] }}$$
      {{ page["text"] }}
      $$/PAGE$$
    {% endfor %}
$$/TEXT$$
```

Create a list of all events for your managing partner based on what is described in the text.

Draw only from events mentioned in the text; nothing extraneous.

Events include occurrences that are seemingly insignificant to the matter at hand in the document, as well as mundane/pedestrian occurrences. Make sure to include ALL events, leaving nothing out (with a few exceptions listed below).

If the text is a transcript, do not include events that took place during the creation of the transcript itself (like the witness being asked a question or actions by a court reporter); rather, include all the events described therein. Also include a single event for the occurrence during which the transcript is being taken.

Do not include events associated with legal authorities if they are part of a legal citation.

Legal arguments or contentions, e.g. interpretations of case law, are not events, although they may make reference to real events that you should include.

Make sure to include events of legal significance even if they did not necessarily come to pass, such as when something is in effect, potential expirations, statutes of limitations, etc.

Assume that when there is a date associated with a document, that document's creation/execution/delivery/etc. should be considered an event in and of itself.

For each event you identify, determine how notable it is on a scale from 0 to 9, with 0 being utterly mundane to the extent that it is almost unworthy of mention and 9 being an essential fact without which the text is meaningless.

In case it is relevant to your analysis, today's date is {{requested_date}}. Do not consider this one of the events to list.

Answer in a JSONL list, with each event as its own JSONL object possessing the following keys:

'description' (string): a fulsome description of the event using language from the text where possible. Use past tense.

'page' (int): page in which the fact is described. If it is described in multiple pages, simply use the first occurrence 'notability' (int): 0 to 9 assessment of the facts' notability 'year' (int): year of the event 'month' (int or null): If discernible 'day' (int or null): If discernible 'hour' Optional(int): If discernible, otherwise do not include. Use military (24 hour) time 'minute' Optional(int): If discernible, otherwise do not include 'second' Optional(int): If discernible, otherwise do not include In creating this JSONL list, make sure to do the following:

If there are no events in the text, respond with a single JSONL object with a key of 'empty' and value of True.

Note that some events may be expressed relatively to each other (e.g., "one day later" or "15 years after the accident"); in those circumstances, estimate the date based on the information provide and make a brief note in the description field.

Keys that are marked as optional (hour, minute, second) should not be included in the event objects if that detail is not present in the text.

Keys that are marked as ($type$ or null) should ALWAYS be present in the list, even when the value is null.

If there is an event that took place over a period of time, include one event in the list for the start and one event for the end, noting as much in the description If there is no datetime information associated with an event, do not include it in your list.

Your answer must be thorough and complete, capturing every item of the types described above that appears in the text.

Return a JSON Lines (newline-delimited JSON) list of the events.

```
<|endofprompt|>
```

Here's the JSONLines list of events:

In some implementations, an input timeline may be specified in a structured format included in the text generation generated by the text generation modeling system 270. For instance, the input timeline may be provided in a JSON format.

The one or more timeline generation response messages are parsed at 1018 to produce one or more parsed timelines events at 1020. In some embodiments, the one or more timeline response messages received at 1016 may include ancillary information such as all or a portion of the timeline generation prompt messages sent at 1012. Accordingly, parsing the timeline generation response messages may involve performing operations such as separating the newly generated timelines from the ancillary information included in the one or more timeline response messages.

One or more deduplication prompts are created at 1022. In some embodiments, a deduplication prompt may be created by inserting events from the parsed timelines at 1020 into the deduplication prompt, for instance via a tool such as Jinja2. Each timeline event may be specified as, for instance, a JSON portion. The deduplication prompt may include an instruction to the text generation modeling system to deduplicate the events.

In some embodiments, in the event that the number of events is sufficiently large that the size of the deduplication prompt would exceed a maximum threshold, then the events may be divided across more than one deduplication prompt. In such a situation, the events may be ordered and/or group temporally to facilitate improved deduplication.

In some embodiments, the one or more deduplication prompts are sent to the text generation modeling system 270 via one or more deduplication prompt messages 1024. The text generation modeling system 270 generates a set of consolidated events at 1026 and provides a response message that includes the consolidated events at 1028.

An example of a deduplication prompt template that may be used to generate a deduplication prompt is provided below:

Below are one or more lists of timeline events, with each event formatted as a JSON object:

```
$$EVENT_LISTS$$
{% for list in event_lists %}
   $$LIST$$
   {% for item in list %}
   {{ item }}
   {% endfor %}
   $$LIST$$
{% endfor %}
$$EVENT_LISTS$$
```

We think that each list may contain some duplicate events, but we may be wrong. Your task is to identify and consolidate any duplicate events. To do this, please perform the following steps for each list:

1. Identify any events in the list that are duplicative.

For our purposes, events are duplicative if their 'description' keys appear to describe the same factual occurrence, even if they have different 'datetime' keys. For example, one event may say "Bob died" while another may say "the death of Bob." Those should be considered duplicate events.

Events are not duplicative just because they occurred on the same day. They must also describe the same occurrence to be considered duplicative.

2. If there are duplicates, keep the event with the most complete description and discard the other duplicates
3. If you discarded any events in step 2, append the items in their 'references' arrays to the 'references' array of the event you chose to keep. Retain the notability score from the event you chose to keep.
4. Re-evaluate the entire list and discard any items from the list that are not valid events, which includes the following:

Legal arguments and contentions, such as allegations that a statute was violated are not valid events.

Actions that took place during a hearing or deposition such as a witness being asked a question or shown a document are not valid events.

The fact that someone testified is not a valid event.

The fact that someone or something was mentioned in the text is not a valid event.

For example, "the document mentioned the defense for the first time" is not a valid event.

The occurrence of a date or time reference in the text by itself, or where the event that occurred on that date is unknown is not a valid event. For example, "the mention of October as a month in which something occurred" is not a valid event. "The occurrence of the year 1986" is also not a valid event. "An event occurred at 7:00" is also not a valid event.

Mentions of exhibits are not valid events.

Respond with a well-formed JSON Lines (newline-delimited JSON) list with one object for each event from the lists provided that is not a duplicate, along with any events that you chose to keep in step 2.

Aside from any changes you made in step 3, keep all the original keys and values for each event you return. For reference, each event should be in the following format:

```
{'id' (string): <id>, 'description' (string):
<description>, 'datetime' (string):
<datetime>, 'references' (array): [{'document_id'
(string): <document_id>, 'page'
(int): <page>}...]}
<|endofprompt|>
```

Here's the JSON Lines list and nothing else:

The one or more consolidation response messages are parsed at 1030 to generate a consolidated timeline. Parsing the one or more consolidation response messages may involve, for instance, separating JSON from ancillary elements of the one or more consolidation response messages, joining events from two or more consolidation response messages into a single consolidated timeline, and the like.

The consolidated timeline is transmitted to the client machine via a consolidation message at 1032, and presented at the client machine at 1034. Presenting the consolidated timeline may involve, for instance, displaying the timeline in a user interface, including the timeline in a chat message, and/or storing the timeline in a file.

Figure 11:
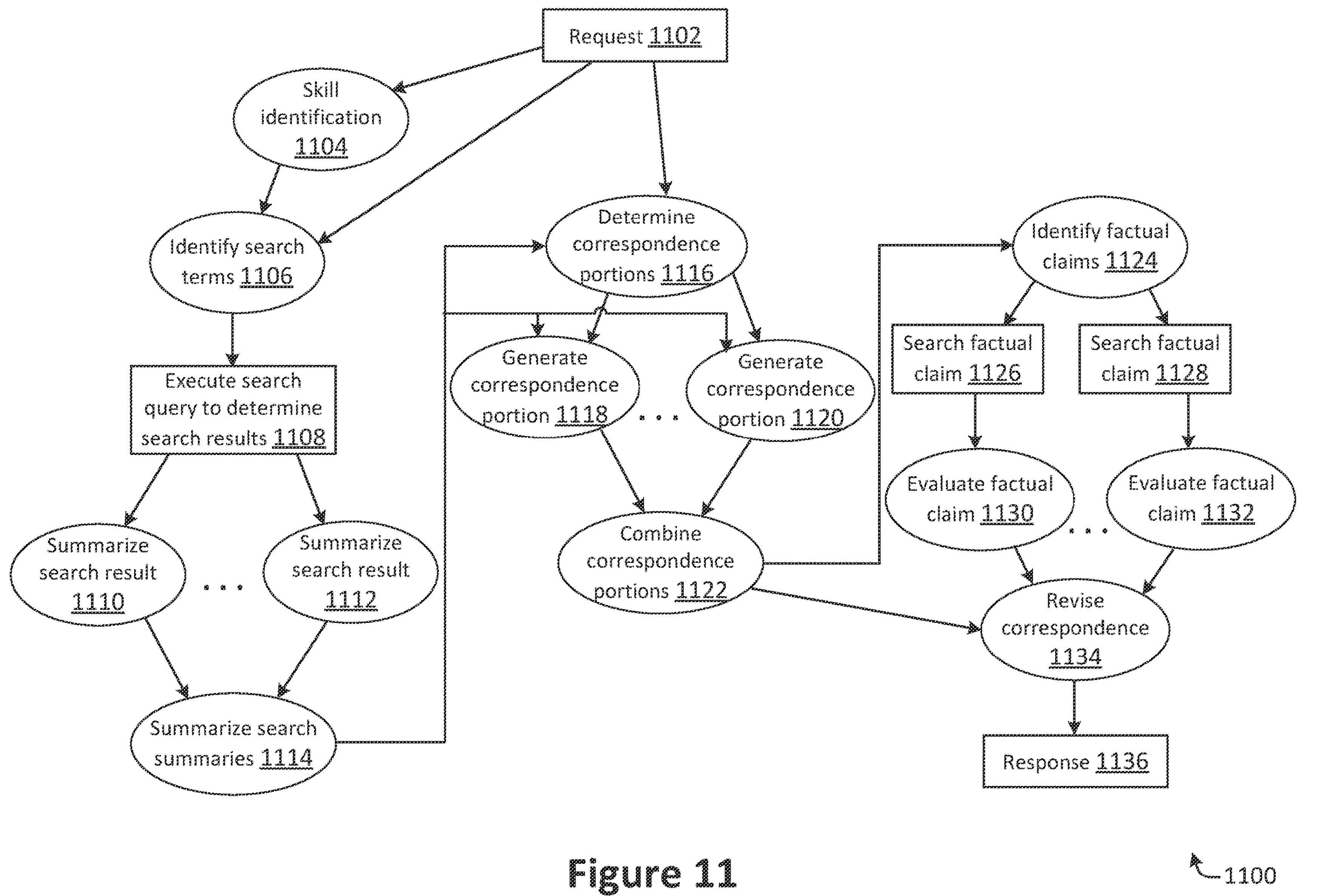
FIG. 11 illustrates a flow diagram for generating correspondence, configured in accordance with one or more embodiments.

FIG. 11 illustrates a flow diagram 1100 for generating correspondence, configured in accordance with one or more embodiments. The flow diagram 1100 provides an example of how techniques and mechanisms described herein may be combined to generate novel text in a manner far more sophisticated than simple back-and-forth interactions with text generation modeling systems. The operations shown in the flow diagram 1100 may be performed at a text generation interface system, such a the system 210 shown in FIG. 2.

A request is received at 1102. In some embodiments, the request may be received as part of a chat flow. Alternatively, the request may be received as part of a correspondence generation flow. The request may, for instance, include a natural language instruction to generate a correspondence letter pertaining to a particular topic on behalf of a particular party.

At 1104, the text generation interface system identifies a skill associated with the request by transmitting a prompt to the text generation modeling system. The text generation modeling system returns a response identifying correspondence generation as the appropriate skill. Additional details regarding skill identification are discussed with respect to FIG. 8.

At 1106, the text generation interface system identifies one or more search terms associated with the correspondence by transmitting a prompt to the text generation modeling system. The text generation modeling system may complete the prompt by identifying, for example, relevant keywords from within the request received at 1102.

At 1108, one or more search queries are executed to determine search results. In some embodiments, one or more search queries may be executed against an external database such as a repository of case law, secondary sources, statutes, and the like. Alternatively, or additionally, one or more search queries may be executed against an internal database such as a repository of documents associated with the party generating the request at 1102.

At 1110-1114, the text generation interface system summarizes the search results and then summarizes the resulting search summaries. According to various embodiments, such operations may be performed by retrieving one or more documents, dividing the one or more documents into chunks, and then transmitting the chunks in one or more requests to the text generation modeling system. Additional details regarding document summarization are discussed throughout the application, for instance with respect to FIG. 9.

At 1116, based at least in part on the search summary, the text generation interface system determines a number of separate correspondence portions to generate. The correspondence portions are then generated at 1118 and 1120 and combined into a single correspondence at 1122. According to various embodiments, such operations may be performed by transmitting appropriate prompts to the text generation modeling system, and then parsing the corresponding responses. Additional details regarding determining correspondence and combining results are discussed throughout the application, for instance with respect to FIGS. 8 and 9.

At 1124, one or more factual claims in the generated correspondence are identified. According to various embodiments, factual claims may include, for instance, citations to legal case law, statutes, or other domain-specific source documents. Factual claims may also include claims based on other accessible information sources such as privately held documents, information publicly available on the internet, and the like.

In some embodiments, the identification of a factual claim may be associated with a respective set of search terms. The search terms may be used to search for evidence for or against the factual claims at 1126-1128. The results of these searches may then be provided in prompts to evaluate the factual claims sent to the text generation modeling system at 1130-1132. The text generation modeling system may complete the prompts by indicating whether the factual claims are accurate given the available search results.

At 1134, the text generation interface system revises the correspondence by transmitting one or more prompts to the text generation modeling system. The requests may include the correspondence generated at 1122 as well as one or more results of the analysis of the factual claims. In this way, the text generation modeling system may revise the correspondence for accuracy, for instance by removing factual claims deemed to be inaccurate.

It is important to note that the particular flow shown in FIG. 11 is only one example of ways in which text generation flows discussed herein may be combined to generate novel text. Many combinations are possible and in keeping with techniques and mechanisms described herein. For example, the flow 1100 may be supplemented with one or more user interactions.

Figure 12:
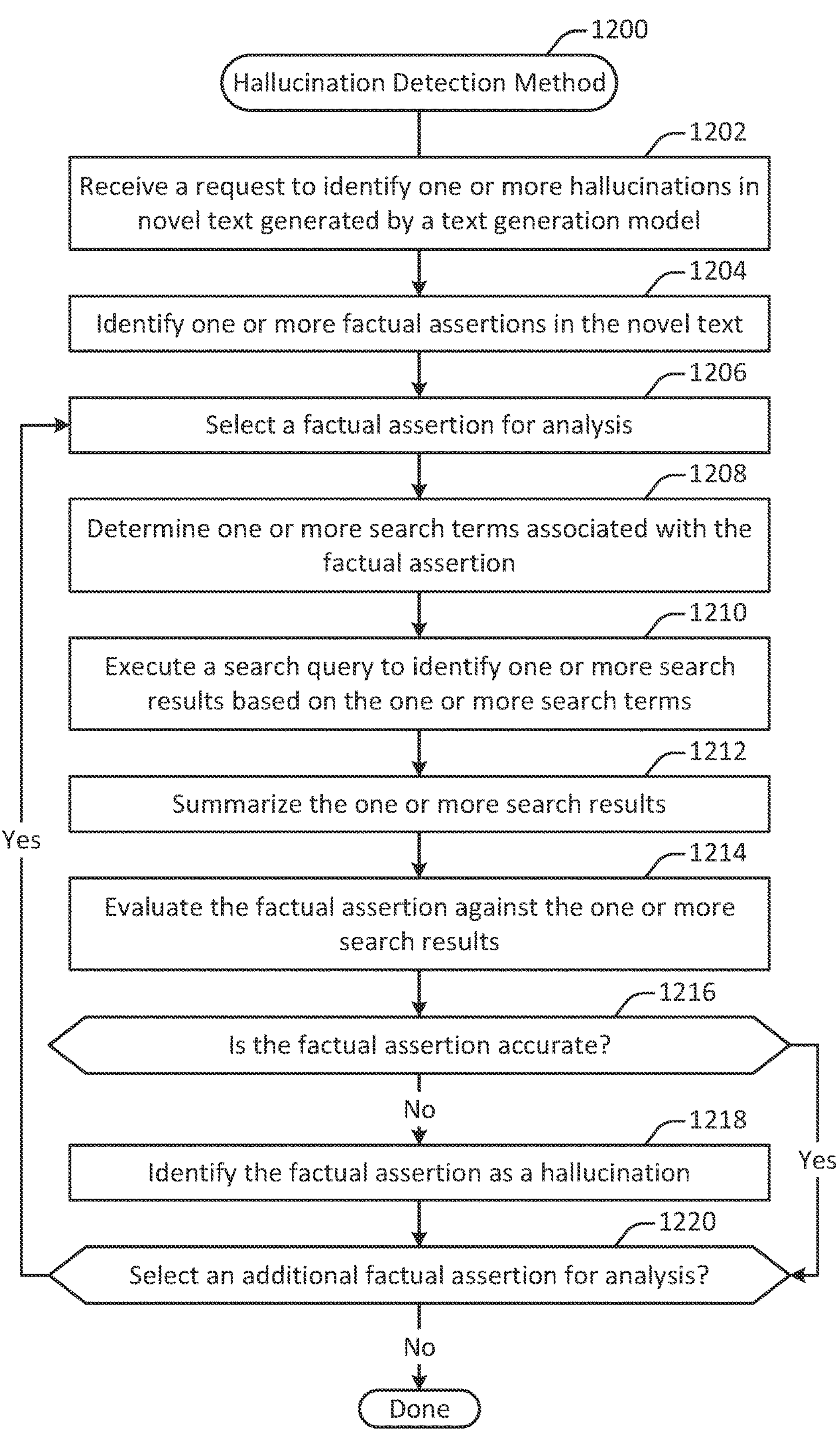
FIG. 12 illustrates a hallucination detection method, performed in accordance with one or more embodiments

FIG. 12 illustrates a hallucination detection method 1200, performed in accordance with one or more embodiments. The method 1200 may be performed by the text generation interface system 210 shown in FIG. 2.

In some embodiments, the method 1200 may be performed in order to determine whether novel text generated by a text generation modeling system includes one or more hallucinations. Generative text systems sometimes generate text that includes inaccurate claims. For example, in the legal sphere, a request to summarize a set of judicial opinions about a point of law may result in a summary text that includes a citation to a non-existent opinion.

A request is received at 1202 to identify one or more hallucinations in novel text generated by a text generation model. In some embodiments, the request may be received as part of one or more methods shown herein. For example, the method 1200 may be performed as part of one or more of the methods shown in FIG. 4, FIG. 8, FIG. 9, FIG. 10, and/or FIG. 11 to evaluate a response returned by the text generation modeling system. When employed in this way, the method 1200 may be used to prompt the system to revise the response, for instance as discussed with respect to FIG. 11. Alternatively, or additionally, the method 1200 may be used to prompt the system to generate a new response, to flag the error to a systems administrator, and/or to inform a response recipient of a potentially inaccurate response.

In some implementations, the request may be received as part of a training and/or testing procedure. For instance, one or more prompts may be tested by the prompt testing utility 226 against one or more tests stored in the test repository 224. A test result may be evaluated using the method 1200 to determine whether a prompt constructed from a prompt template being tested resulted in the generation of a hallucination, which may be treated as a test failure.

One or more factual assertions in the novel text are identified at 1204. In some embodiments, the one or more factual assertions may be identified by transmitting a prompt to the text generation modeling system. For instance, the novel text may be included in a prompt requesting that the text generation modeling system identify factual claims in the novel text. The resulting completed prompt may be parsed to identify the one or more factual assertions.

A factual assertion is selected for analysis. Factual assertions identified at 1204 may be analyzed in sequence, in parallel, or in any suitable order.

One or more search terms associated with the factual assertion are determined at 1208. In some embodiments, one or more search terms may be returned by the text generation modeling system at 1204. Alternatively, or additionally, one or more search terms may be determined based on a separate request sent to the text generation modeling system for the factual assertion being analyzed.

A search query to identify one or more search results based on the one or more search terms is executed at 1210. According to various embodiments, one or more searches may be executed against any suitable database. Such databases may include, but are not limited to: public sources such as the internet, internal document databases, and external document databases.

The one or more search results are summarized at 1212. In some embodiments, summarizing the one or more search results may involve, for instance, dividing documents into chunks and transmitting the one or more chunks to the text generation modeling system within summarization prompts.

At 1214, the factual assertion is evaluated against the one or more search results. In some embodiments, evaluating the factual assertion may involve transmitting to the text generation modeling system a prompt that includes a request to evaluate the factual assertion, information characterizing the factual assertion, and a summary of the one or more search results determined as discussed at 1212.

A determination is made at 1216 as to whether the factual assertion is accurate. In some embodiments, the determination may be made by parsing the response returned by the text generation modeling system at 1214. For instance, the text generation modeling system may complete the prompt by indicating whether the factual assertion is true, false, or uncertain based on the provided summary of search results.

If it is determined that the factual assertion is inaccurate, then at 1218 the factual assertion is identified as a hallucination. In some embodiments, identifying the factual assertion as a hallucination may cause one or more consequences in an encompassing process flow. For example, in a testing phase, the detection of a hallucination may cause the test to fail. As another example, in a production phase, the detection of a hallucination may cause the system to initiate a flow to revise the novel text to remove the hallucination.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of large language models. However, the techniques of disclosed herein apply to a wide variety of language models. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

The invention claimed is:

1. A method comprising:

receiving an input message from a client machine via a communication interface, the input message identifying one or more bodies of text;

selecting a designated text generation prompt template of a plurality of text generation prompt templates based on the input message, the designated text generation prompt template including (1) natural language instructions to generate novel text based on the one or more bodies of text and (2) one or more fillable portions;

determining a designated text generation prompt via a first processor based on the input message and the designated text generation prompt template, the text generation prompt including (1) the natural language instructions and (2) a subset of the one or more bodies of text inserted into the one or more fillable portions;

transmitting a designated text generation prompt message including the designated text generation prompt to a remote text generation modeling system via the communication interface;

receiving a designated text generation prompt response message from the remote text generation modeling system via the communication interface, the designated text generation prompt response message including novel text generated by a text generation model implemented at the remote text generation modeling system, the natural language instructions including a first natural language instruction identifying a first type of information to exclude from the novel text and a second natural language instruction identifying a second type of information to include in the novel text, the novel text being generated responsive to the text generation model interpreting and executing the natural language instructions based on the subset of the one or more bodies of text;

parsing the designated text generation prompt response message via a second processor to generate a response text based on the novel text; and transmitting an output message to the client machine via the communication interface, the output message being determined based on the response text.

2. The method recited in claim 1, wherein the input message identifies one or more documents, and wherein the input message further comprises:

determining a plurality of document portions based on the one or more documents, each of the document portions including a respective number of words below a designated chunk threshold.

3. The method recited in claim 2, the method further comprising:

determining a designated number of chunks based on the plurality of document portions, each of the chunks including a respective one or more of the document portions, the respective document portions including in a chunk being of a total size that is below the designated chunk threshold.

4. The method recited in claim 1, wherein the input message identifies one or more documents, and wherein the designated text generation prompt is one of a plurality of text generation prompts created based on the input message, and wherein each of the plurality of text generation prompts includes a respective request to summarize text determined based on the one or more documents.

5. The method recited in claim 4, wherein the designated text generation prompt response message is one of a plurality of text generation response messages generated based on the plurality of text generation prompts, and wherein each of the plurality of text generation response messages includes a respective document summary.

6. The method recited in claim 5, the method further comprising:

parsing the plurality of text generation response messages to generated a combined summary based on the respective document summaries.

7. The method recited in claim 6, the method further comprising:

determining a text consolidation prompt via a third processor based on the combined summary and a text consolidation prompt template;

transmitting a designated text consolidation prompt message including the text consolidation prompt template to the remote text generation modeling system via the communication interface; and receiving a text consolidation response message from the remote text generation modeling system via the communication interface, wherein the output message includes a consolidated summary determined based on the text consolidation response message.

8. The method recited in claim 1, wherein the input message includes a request to generate correspondence, and wherein the designated text generation prompt includes one or more instructions for generating the correspondence.

9. The method recited in claim 8, wherein the one or more instructions identify a topic to be discussed in the correspondence.

10. The method recited in claim 1, wherein the input message includes a request to revise a correspondence, and wherein the designated text generation prompt includes the correspondence and one or more instructions for revising the correspondence.

11. The method recited in claim 1, wherein the input message includes a request to generate a timeline based on one or more documents, and wherein the designated text generation prompt response message includes one or more events to include in the timeline, each of the events including a respective time and a respective event description.

12. The method recited in claim 11, wherein the method further comprises:

determining an event deduplication prompt via a third processor based on the events and an event deduplication prompt template;

transmitting an event deduplication prompt message including the event deduplication prompt template to the remote text generation modeling system via the communication interface; and receiving an event deduplication response message from the remote text generation modeling system via the communication interface, wherein the output message includes a timeline determined based on the designated text generation prompt response message.

13. A system including a communication interface and one or more processors, the system configured to perform a method comprising:

receiving an input message from a client machine via a communication interface, the input message identifying one or more bodies of text;

selecting a designated text generation prompt template of a plurality of text generation prompt templates based on the input message, the designated text generation prompt template including (1) natural language instructions to generate novel text based on the one or more bodies of text and (2) one or more fillable portions;

determining a designated text generation prompt via a first processor based on the input message and the designated text generation prompt template, the text generation prompt including (1) the natural language instructions and (2) a subset of the one or more bodies of text inserted into the one or more fillable portions;

transmitting a designated text generation prompt message including the designated text generation prompt to a remote text generation modeling system via the communication interface;

receiving a designated text generation prompt response message from the remote text generation modeling system via the communication interface, the designated text generation prompt response message including novel text generated by a text generation model implemented at the remote text generation modeling system, the natural language instructions including a first natural language instruction identifying a first type of information to exclude from the novel text and a second natural language instruction identifying a second type of information to include in the novel text, the novel text being generated responsive to the text generation model interpreting and executing the natural language instructions based on the subset of the one or more bodies of text;

parsing the designated text generation prompt response message via a second processor to generate a response text based on the novel text; and transmitting an output message to the client machine via the communication interface, the output message being determined based on the response text.

14. The system recited in claim 13, wherein the input message identifies one or more documents, and wherein the input message further comprises:

determining a plurality of document portions based on the one or more documents, each of the document portions including a respective number of words below a designated chunk threshold.

15. The system recited in claim 14, wherein the system is further configured to: determine a designated number of chunks based on the plurality of document portions, each of the chunks including a respective one or more of the document portions, the respective document portions including in a chunk being of a total size that is below the designated chunk threshold.

16. The system recited in claim 15, wherein the system is further configured to: determine a designated number of chunks based on the plurality of document portions, each of the chunks including a respective one or more of the document portions, the respective document portions including in a chunk being of a total size that is below the designated chunk threshold.

17. One or more non-transitory computer readable media having instructions stored thereon for performing a method, the method comprising:

receiving an input message from a client machine via a communication interface, the input message identifying one or more bodies of text;

selecting a designated text generation prompt template of a plurality of text generation prompt templates based on the input message, the designated text generation prompt template including (1) natural language instructions to generate novel text based on the one or more bodies of text and (2) one or more fillable portions;

determining a designated text generation prompt via a first processor based on the input message and the designated text generation prompt template, the text generation prompt including (1) the natural language instructions and (2) a subset of the one or more bodies of text inserted into the one or more fillable portions;

transmitting a designated text generation prompt message including the designated text generation prompt to a remote text generation modeling system via the communication interface;

receiving a designated text generation prompt response message from the remote text generation modeling system via the communication interface, the designated text generation prompt response message including novel text generated by a text generation model implemented at the remote text generation modeling system, the natural language instructions including a first natural language instruction identifying a first type of information to exclude from the novel text and a second natural language instruction identifying a second type of information to include in the novel text, the novel text being generated responsive to the text generation model interpreting and executing the natural language instructions based on the subset of the one or more bodies of text;

parsing the designated text generation prompt response message via a second processor to generate a response text based on the novel text; and transmitting an output message to the client machine via the communication interface, the output message being determined based on the response text.

18. The one or more non-transitory computer readable media recited in claim 17, wherein the input message identifies one or more documents, and wherein the input message further comprises:

determining a plurality of document portions based on the one or more documents, each of the document portions including a respective number of words below a designated chunk threshold.

19. The one or more non-transitory computer readable media recited in claim 18, the method further comprising:

determining a designated number of chunks based on the plurality of document portions, each of the chunks including a respective one or more of the document portions, the respective document portions including in a chunk being of a total size that is below the designated chunk threshold.

* * * * *